US011189267B2

(12) United States Patent
Cronin et al.

(10) Patent No.: US 11,189,267 B2
(45) Date of Patent: Nov. 30, 2021

(54) INTELLIGENCE-DRIVEN VIRTUAL ASSISTANT FOR AUTOMATED IDEA DOCUMENTATION

(71) Applicant: Bright Marbles, Inc., Menlo Park, CA (US)

(72) Inventors: John Cronin, Jericho, VT (US); Burt Cummings, Menlo Park, CA (US); Charles Root, Underhill, VT (US); Michael D'Andrea, Burlington, VT (US); Jeffrey Goodwin, Montpelier, VT (US); Nagesh Kadaba, Roswell, GA (US)

(73) Assignee: Bright Marbles, Inc., Menlo Park, CA (US)

( * ) Notice: Subject to any disclaimer, the term of this patent is extended or adjusted under 35 U.S.C. 154(b) by 219 days.

(21) Appl. No.: 16/550,992

(22) Filed: Aug. 26, 2019

(65) Prior Publication Data
US 2020/0066259 A1 Feb. 27, 2020

Related U.S. Application Data

(60) Provisional application No. 62/722,408, filed on Aug. 24, 2018, provisional application No. 62/722,608, (Continued)

(51) Int. Cl.
*G10L 15/22* (2006.01)
*G10L 15/08* (2006.01)
(Continued)

(52) U.S. Cl.
CPC ...... *G10L 15/083* (2013.01); *G06F 16/90332* (2019.01); *G10L 15/1822* (2013.01); (Continued)

(58) Field of Classification Search
CPC ............ G10L 2015/00; G10L 2015/06; G10L 2015/063; G10L 2015/0638;
(Continued)

(56) References Cited

U.S. PATENT DOCUMENTS 5,059,528 A 10/1991 Bollen et al.
5,814,467 A 9/1998 Curtiss et al.
(Continued)

FOREIGN PATENT DOCUMENTS

KR 2018-0019869 2/2018

OTHER PUBLICATIONS

U.S. Appl. No. 16/551,509 Office Action dated Apr. 14, 2021.
(Continued)

*Primary Examiner* — Qi Han
(74) *Attorney, Agent, or Firm* — Polsinelli LLP

(57) ABSTRACT

An intelligence-driven virtual assistant for automated documentation of new ideas is provided. During a brainstorming session, one or more user participants may discuss and identify one or more ideas. Such ideas may be tracked, catalogued, analyzed, developed, and further expanded upon through use of an intelligence-driven virtual assistant. Such virtual assistant may capture user input data embodying one or more new ideas and intelligently process the same in accordance with creativity tool workflows. Such workflows may further guide development and expansion upon a given idea, while continuing to document, analyze, and identify further aspects to develop and expand.

21 Claims, 17 Drawing Sheets

Related U.S. Application Data filed on Aug. 24, 2018, provisional application No. 62/736,823, filed on Sep. 26, 2018.

(51) Int. Cl.
   *G10L 15/18*   (2013.01)
   *G06F 16/9032*   (2019.01)

(52) U.S. Cl.
   CPC ........ *G10L 15/22* (2013.01); *G10L 2015/088* (2013.01); *G10L 2015/223* (2013.01)

(58) Field of Classification Search
   CPC ............. G10L 2015/08; G10L 2015/22; G10L 2015/223; G10L 2015/225; G10L 2015/228; G10L 15/22; G10L 15/00; G10L 15/06; G10L 15/063; G10L 15/08; G10L 15/18; G10L 2015/221–228; G10L 15/083; G10L 15/065; G10L 15/16; G10L 15/183; G10L 15/20; G10L 15/26; G10L 15/28
   USPC .... 704/270.1, 270, 275, 276, 231, 235, 236, 704/243, 251, 255, 257
   See application file for complete search history.

(56) References Cited

U.S. PATENT DOCUMENTS

| | | | |
|---|---|---|---|
| 6,266,635 B1 * | 7/2001 | Sneh ................. | G10L 15/22 704/235 |
| 6,934,905 B1 | 8/2005 | Tighe | |
| 7,493,253 B1 | 2/2009 | Ceusters et al. | |
| 7,711,547 B2 | 5/2010 | Abir | |
| 7,996,440 B2 | 8/2011 | Probst et al. | |
| 8,131,557 B2 | 3/2012 | Davis et al. | |
| 9,047,857 B1 | 6/2015 | Barton | |
| 9,111,214 B1 | 8/2015 | Sharma et al. | |
| 9,904,675 B2 | 2/2018 | Kantor et al. | |
| 9,912,769 B2 | 3/2018 | Gong et al. | |
| 10,013,980 B2 | 7/2018 | Borsutsky et al. | |
| 10,834,145 B2 | 11/2020 | Buddenbaum et al. | |
| 11,081,113 B2 | 8/2021 | Cronin | |
| 2001/0034629 A1 | 10/2001 | Cronin | |
| 2004/0189702 A1 | 9/2004 | Hlavac et al. | |
| 2005/0182773 A1 | 8/2005 | Feinsmith | |
| 2006/0036452 A1 | 2/2006 | Williams | |
| 2006/0036529 A1 | 2/2006 | Williams | |
| 2006/0036632 A1 | 2/2006 | Williams | |
| 2006/0036635 A1 | 2/2006 | Williams | |
| 2008/0046394 A1 | 2/2008 | Zhou et al. | |
| 2010/0174760 A1 | 7/2010 | Longobardi et al. | |
| 2012/0166414 A1 | 6/2012 | Decker et al. | |
| 2012/0233037 A1 | 9/2012 | Lamoureux et al. | |
| 2013/0117018 A1 | 5/2013 | O'Sullivan et al. | |
| 2014/0122056 A1 | 5/2014 | Duan | |
| 2014/0122083 A1 | 5/2014 | Xiaojiang | |
| 2015/0007055 A1 | 1/2015 | Lemus et al. | |
| 2015/0020002 A1 | 1/2015 | McKenzie et al. | |
| 2015/0271218 A1 | 9/2015 | Steingrimsson | |
| 2016/0021557 A1 | 1/2016 | Tabet et al. | |
| 2016/0044073 A1 | 2/2016 | Rosenberg | |
| 2017/0235848 A1 | 8/2017 | Van Dusen et al. | |
| 2017/0310613 A1 | 10/2017 | Lalji et al. | |
| 2018/0018564 A1 | 1/2018 | Erenrich et al. | |
| 2018/0032576 A1 | 2/2018 | Romero | |
| 2018/0131645 A1 | 5/2018 | Magliozzi et al. | |
| 2018/0174103 A1 | 6/2018 | Auger | |
| 2018/0191596 A1 * | 7/2018 | Bhaya ................. | G10L 15/26 |
| 2018/0218285 A1 * | 8/2018 | Oliner ................ | G06F 16/2477 |
| 2018/0357032 A1 | 12/2018 | Popovich et al. | |
| 2019/0052701 A1 * | 2/2019 | Rathod ................. | H04L 67/22 |
| 2019/0079996 A1 | 3/2019 | Mochel et al. | |
| 2019/0279619 A1 | 9/2019 | Krasadakis | |
| 2020/0065924 A1 | 2/2020 | Cronin | |
| 2020/0066277 A1 | 2/2020 | Cronin | |
| 2020/0167630 A1 | 5/2020 | Cronin | |

OTHER PUBLICATIONS

PCT/US19/48115, Intelligence-Driven Virtual Assistant for Automated Idea Documentation, Aug. 26, 2019.
U.S. Appl. No. 16/551,365, John Cronin, Idea Assessment and Landscape Mapping, filed Aug. 26, 2019.
PCT/US19/48158, Idea Assessment and Landscape Mapping, Aug. 26, 2019.
U.S. Appl. No. 16/551,509, John Cronin, Ideation Virtual Assistant Tools, filed Aug. 26, 2019.
PCT/US19/48182, Ideation Virtual Assistant Tools, Aug. 26, 2019.
U.S. Appl. No. 16/551,055, John Cronin, Idea Scoring for Creativity Tool Selection, filed Aug. 26, 2019.
PCT/US19/48122, Idea Scoring for Creativity Tool Selection, Aug. 26, 2019.
U.S. Appl. No. 17/381,718, John Cronin, Idea Scoring for Creativity Tool Selection, filed Jul. 21, 2021.

* cited by examiner

| Record | Background | Claims | Value | Prior Art | Independent Claim Header | Claim Elements | Wherein | Dependent Claims |
|---|---|---|---|---|---|---|---|---|
| 1 | What Problem 1.txt | How 1.txt | Why 1.txt | Prior Art 1.txt | Header.txt | Element 1.txt | Wherein.txt | Dependent Claim 1.txt |
| 2 | What Problem 2.txt | How 2.txt | Why 2.txt | Prior Art 2.txt | | Element 2.txt | | Dependent Claim 2.txt |
| 3 | What Problem 3.txt | How 3.txt | Why 3.txt | Prior Art 3.txt | | Element 3.txt | | Dependent Claim 3.txt |
| 4 | | | | Prior Art 4.txt | | Element 4.txt | | Dependent Claim 4.txt |
| ... | | | | ... | | ... | | ... |
| n | | | | Prior Art n.txt | | Element n.txt | | Dependent Claim n.txt |

FIG. 16

INTELLIGENCE-DRIVEN VIRTUAL ASSISTANT FOR AUTOMATED IDEA DOCUMENTATION

CROSS-REFERENCE TO RELATED APPLICATIONS

The present patent application claims the priority benefit of U.S. provisional patent application 62/722,408 filed Aug. 24, 2018, U.S. provisional patent application 62/722,608 filed Aug. 24, 2018, and U.S. provisional patent application 62/736,823 filed Sep. 26, 2018, the disclosures of which are incorporated herein by references.

BACKGROUND OF THE INVENTION

1. Field of the Disclosure

The present disclosure is generally related to a virtual assistant, and more particularly related to intelligence-driven virtual assistant for automated documentation of new ideas.

2. Description of the Related Art

Present technical and scientific personnel may create and develop various innovations using an ad-hoc approach. Such ad hoc approaches may result in various inefficiencies and duplicative work. For example, ideas and innovations may be created by teams in which individuals may exchange and build upon each other's ideas. Such exchange and building may occur verbally, in person, and/or across multiple platforms. There are presently no tool available, however, that is capable of capturing and tracking ideas and their development in a systematic way Technical and scientific personnel may document ideas, for example, through handwritten notes on paper, whiteboards, or other handwriting surfaces. Most ideas are not even annotated when they are first created as there is no efficient way to capture every idea in ad-hoc or brainstorming meetings. Documentation that is reliant on human notetakers may further be illegible, incomplete, or otherwise inaccurate. Such problems may be exacerbated when teams are large, such as may exist in large enterprises.

There is a lack of tools that help provide for building conversational interfaces into a virtual assistant application using voice and text. Presently available documentation, communication, and creativity tools lack the ability to fully document such interactions and exchanges, particularly verbal interactions. Current speech recognition and natural language processing systems are likewise lacking, as such systems are not integrated for practical use in enhancing documentation of creation and innovation activity. Moreover, very few inventors use creativity tools, for example, to assist in the development of new ideas.

Thus, there is a need for providing an interactive innovation tool to systematize documentation of creative thinking and innovation activities, as well as a need for integration of advanced deep learning functionalities of automatic speech recognition (ASR) for converting speech to text, and natural language understanding (NLU) to recognize the intent of the text, to build applications with highly engaging user experiences, and lifelike conversational interactions in real-time during an innovation or ideation session.

SUMMARY OF THE CLAIMED INVENTION

Embodiments of the present invention provide an intelligence-driven virtual assistant for automated documentation of new ideas. Such virtual assistant may capture user input data embodying one or more new ideas and intelligently process the same in accordance with creativity tool workflows. Such workflows may further guide development and expansion upon a given idea, while continuing to document, analyze, and identify further aspects to develop and expand. Further embodiments may include systems for guiding conversational creation and innovation sessions. Such systems may include artificial intelligence (AI)-driven speech recognition, chatbots designed to stimulate conversations regarding ideas with one or more human users via auditory or textual prompts, semantic search and discovery into insights and relationships among ideas, technical databases, and scholarly literature, applying machine learning to identify creation patterns and to make decisions regarding promising ideas, knowledge management and discovery of relevant material from various online sources, automated production of an idea creation and development record, context-sensitive dashboard reports and analytics, and speech synthesis.

BRIEF DESCRIPTION OF THE DRAWINGS

FIG. 16 illustrates an exemplary database for storing documented creation and innovation activities.

DETAILED DESCRIPTION

Embodiments of the present invention provide an intelligence-driven virtual assistant for automated documentation of new ideas. During a brainstorming (e.g., ideation, creation, creativity, innovation) session, one or more user participants may discuss and identify one or more ideas. Such ideas may be tracked, catalogued, analyzed, developed, and further expanded upon through use of an intelligence-driven virtual assistant. Such virtual assistant may capture user input data embodying one or more new ideas and intelligently process the same in accordance with creativity tool workflows. Such workflows may further guide development and expansion upon a given idea, while continuing to document, analyze, and identify further aspects to develop and expand. Further embodiments may include systems for guiding conversational creation and innovation sessions. Such systems may include artificial intelligence (AI)-driven speech recognition, chatbots designed to stimulate conversations regarding ideas with one or more human users via auditory or textual prompts, semantic search and discovery into insights and relationships among ideas, technical databases, and scholarly literature, applying machine learning to identify creation patterns and to make decisions regarding promising ideas, knowledge management and discovery of relevant material from various online sources, automated production of an idea creation and development record, context-sensitive dashboard reports and analytics, and speech synthesis.

Figure 1:
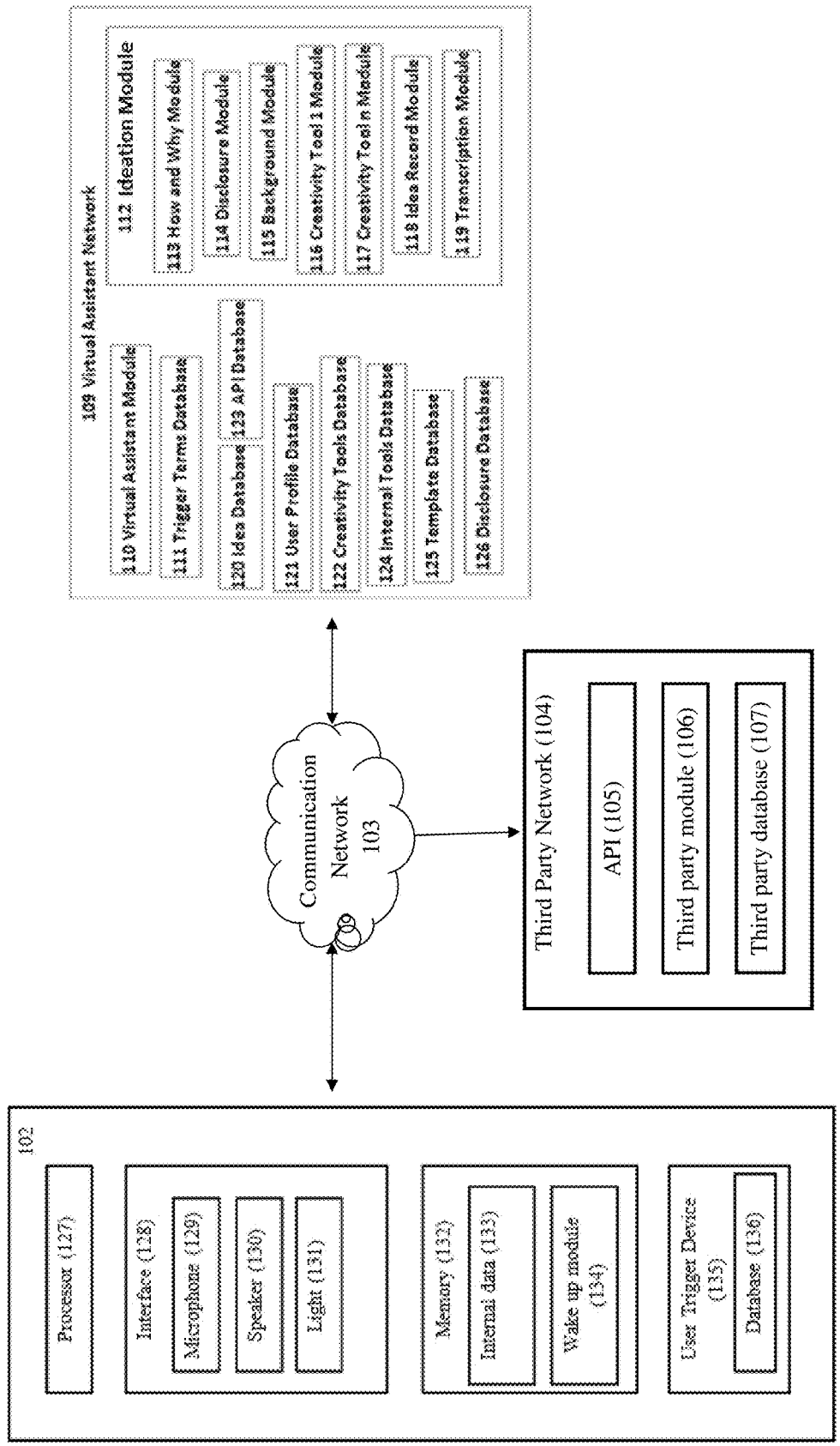
FIG. 1 illustrates an exemplary network environment in which an exemplary system for intelligence-driven virtual assistant for automated documentation may be implemented.

FIG. 1 illustrates an exemplary network environment 100 in which an exemplary system for intelligence-driven virtual assistant for automated documentation may be implemented. Network environment 100 may comprise of a virtual assistant device 102, third party network 104, and a virtual assistant network 104, all of which may communicate through a communication network 103.

Virtual assistant device 102 may include a processor 127, interface(s) 128 (e.g., microphone 129, speaker 130, and light 131), and a memory 132 (e.g., internal database 133, wake up module 134). The processor 127 may be configured to decode and execute any instructions received from one or more other electronic devices or server(s). The processor 127 may include one or more general-purpose processors (e.g., INTEL® or Advanced Micro Devices® (AMD) microprocessors) and/or one or more special purpose processors (e.g., digital signal processors or Xilinx® System On Chip (SOC) Field Programmable Gate Array (FPGA) processor). The processor 127 may be configured to execute one or more computer-readable program instructions, such as program instructions to carry out any of the functions described in this description.

The interface(s) 128 may help an operator to interact with the virtual assistant device 102. The interface(s) 128 of the virtual assistant device 102 may either accept an input from the operator or provide an output to the operator, whether visually or through audio. The interface(s) 128 may include a microphone 129, a speaker 130, and/or a light 131. In some embodiments, the interface(s) 128 may also include various types of user interfaces, such as a command line interface (CLI), graphical user interface (GUI), or a voice interface.

In one embodiment, the microphone 129 corresponds to an instrument that converts sound waves into electrical energy variations, which may then be amplified, transmitted, or recorded. The microphone 129 may therefore capture audio data and convert into a digital file for storage in a database in memory 132 of the virtual assistant device 102.

Speaker 130 may correspond to a device containing a transducer for converting electrical signals (electric current) into sound waves (acoustic energy) to produce sound. Further, the light 131 on the virtual assistant device 102 may be activated to illuminate, change colors, and indicate different status (e.g., actions, alerts, state). The type of light 131 may include but not limited to light-emitting diodes (LEDs).

The memory 132 may store various modules implemented as a program. The memory 132 may comprise various databases for storing input data (e.g., speech or audio data captured by microphone 129), whether temporarily or permanently. The databases may store speech and audio data captured by the microphone 129 on the virtual assistant device 102. One or more different databases may be stored in memory 132. Usage of multiple different databases may also allow segregated storage of different data and may thus reduce time to access required data.

Memory 132 may further include an internal database 133. Table 1 below illustrates exemplary data stored in the internal database 133. The internal database 133 may comprise keyword(s) for storing any number of keywords related to the description. The internal database 133 may also comprise a description for storing a description of ideas, products or other customized scripts.

TABLE 1

| Keywords | Description |
| --- | --- |
| Widget; fly; invention | Invention: a widget that allow a person to fly |
| Pen; paper; ink; product | Product: a pen that filled with ink and used for writing on paper |
| Lawn; mow; lawn mower; Problem | Problem: the customer had issues mowing the lawn because of so many low hanging branches |

The memory 132 may also comprise a wake-up module 134 executable by the processor 127 to continuously poll for audio data via the microphone 129. Such polling by wake-up module 134 may specifically detect a predetermined wake-up term, phrase, keyword, change in tone or volume, or other audio-based trigger. The operation of wake-up module 134 is discussed in further detail with respect to FIG. 3.

In some embodiments, the virtual assistant device 102 may also include a user trigger device 135, which may provide an interface that allows the user to trigger an action in the virtual assistant device 102 and the virtual assistant network 109. User trigger device 135 may include, for example, a physical or graphical button that may be selected or activated, resulting in a signal being communicated either wirelessly or directly to virtual assistant device 102 or virtual assistant network 109. The user trigger device 135 may further be associated with a database 136 for storing trigger data (e.g., conditions under which each action is triggered, pre-programmed actions and replies).

The communication network 103 may be inclusive of wired and wireless networks. The communication network 103 may be implemented, for example, using communication techniques such as visible light communication (VLC), worldwide interoperability for microwave access (WiMAX), long term evolution (LTE), wireless local area network (WLAN), infrared (IR) communication, public switched telephone network (PSTN), radio waves, and other communication techniques known in the art. The communication network 103 may allow ubiquitous access to shared pools of configurable system resources and higher-level services that can be rapidly provisioned with minimal management effort, often over the Internet and may rely on shared resources to achieve coherence and economies of scale, like a public utility, while third-party clouds enable organizations to focus on their core businesses instead of expending resources on computer infrastructure and maintenance.

Virtual assistant network 109 can be located on a remote server in the cloud or be integrated into virtual assistant device 102 or associated servers. Virtual assistant network 109 may include virtual assistant module 110, trigger terms database 111, and ideation management module 112. The ideation module 112 may include "how and why" idea development module 113, idea expansion and disclosure module 114, background module 115, creativity tool 1 module 116, creativity tool n module 117, idea record module 118, and transcription module 119. Virtual assistant network 109 may further include idea database 120, user profile database 121, creativity tools database 122, API database 123, internal tools database 124, template database 125, and disclosure database 126.

Virtual assistant module 110 may include virtual assistants known in the art, such as Amazon Alexa, Google Assistant, Apple Siri, Microsoft Cortana, etc. Virtual assistant module 110 can use certain words, phrases, invocations, or prompts to trigger other applications or modules or actions.

Trigger terms database 111 may load and store the words, phrases, terms, invocations, or prompts that are used to trigger certain actions or start applications. In one embodiment, the trigger terms database 111 may load and store the words, phrases, terms, invocations, or prompts that are used to trigger certain actions or initiate execution of an associated module or application. The trigger terms database 111 may also comprise trigger terms for updating existing trigger terms, keywords, phrases, or invocations. The trigger terms database 111 may further comprise an action or execution storage section for storing actions to be taken or modules/applications to be executed upon identification of the associated trigger term. The trigger terms database 111 may further comprise algorithm storage section for storing algorithms or instructions executable by processor 127. Such algorithms or instructions may identify the specific application or module, as well as parameters and conditions on how such application or module is to be executed. Further, pre-programmed responses may also be stored in the trigger terms database 111.

Ideation module 112 may be triggered, for example, when the virtual assistant module 110 recognizes the keyword, term or phrase assigned to initiate execution of the Ideation module 112. "How and why" module 113 may include an iterative system that analyzes data regarding an idea and pose queries (e.g., "how and why") to further develop the idea in a variety of different directions. Execution of the "how and why" module 113 further analyzes the responses to the queries and pose further queries based on the responses.

Disclosure module 114 may further expand upon the answers to the queries posed by the "how and why" module 113. Disclosure module 114 may further process and consolidate the query responses with information from a variety of sources, including background module 115, technical databases, online resources, etc. The result may include a report with a detailed description of the idea. Such report may describe the general idea, as well as its specific features and components, operations and functions, applications, use cases, and other details.

Background module 115 may be executable to identify related background data from a variety of different data sources. Such background data may be provided to "how and why" module 113 to formulate queries regarding the idea, as well as provided to disclosure module 114 for inclusion in the detailed description as context for the idea. Background module 115 may identify patents, for example, in the same field of technology. The information from such patents may be analyzed to identify similarities and differences. Background data—whether specific portions or the entirety of a patent—that meets a defined level of similarity may be flagged and provided to "how and why" module 113 to formulate queries. Such queries and query responses may further expand upon the original idea, and may be used by disclosure module 114 to prepare the report.

Creativity tool 1 module 116 and creativity tool n module 117 may be inclusive of any number of creativity tools used to spark ideas. For example, ideation module 112 may select from among a variety of different types of creativity tools and trigger creativity tool 1 module 116. Such selection may be random, based on the user(s), or driven by artificial intelligence based on a current state of a conversation or other user interaction. Such creativity tool 1-$n$ modules 116-117 may be executed to guide a brainstorming activity. For example, creativity tool 1 116 may detect one or more terms and select one or more verbs from a verb database (or other types of words, images, video clips, sounds, etc., from other types of databases) to associate with the detected term(s). Such terms and selected content may be output to the user(s) as prompts for further conversation, including that guided by "how and why" module 113.

Idea record module 118 may be triggered when a prompt (e.g., defined term in trigger terms database 111) is detected by virtual assistant module 110. Such prompt may represent a request to document a potential idea being discussed or in development. Idea record module 118 may be executable to record conversations and interactions around the idea. Virtual assistant device 102 may store the recording captured by idea record module 118 in a specified idea database 120, as well as triggering transcription module 119 to transcribe the recording.

Transcription module 119 may transcribe the idea recording stored in the idea database 120. Transcription by transcription module 119 may be triggered by the idea record module 118. In some instances, the transcription may be sent or output—as prompted, at set intervals, or in real-time—to the user(s) or other modules, such as "how and why" module 113 for analysis and query formulation, disclosure module 114 for analysis and inclusion in the report, background module 115 for further background search, or creativity tool 1-$n$ modules 116-117 to prompt further brainstorming activities. The resulting transcription may also be stored in the idea database 120.

Idea database 120 may store the user idea recordings, as well as the respective transcribed text. User profile database 121 may store information about the user(s), including but not limited to email address, title or role, usage data, idea generation, ideation training, etc. Creativity tool database 122 may store data regarding and related to the available creativity tools 1-$n$ modules 116-117, including identification of any associated APIs for integration and interoperability with other modules in virtual assistant network 109. Some embodiments may include a API database 123 that may store current APIs for any of the modules in virtual assistant network 109.

Internal tools database 124 may store data for custom creativity tools not available through an API. For example, the internal tools database 124 may store previous ideas, products, or services that may serve as building blocks for continuing improvement and innovation. Such data stored in internal tools database 124 may be improved upon or used to direct a creativity or ideation session.

Template database 125 may store the information compiled by the "how and why" module 113, disclosure module 114, and background module 115 in one or more predefined templates. The information provided by the other modules 113-115 may be used to populate fields in a selected template, for example, so as to streamline preparation of various technical, business, legal, and other documents. Disclosure database 126 may store the resulting documents or files.

Further, a third party network 104 may further be connected to the communication network 103. Third party network 104 may include one or more networks on the Internet or cloud that stores module and data for different creativity tools. For example, a third party network 104 may host tools that could be accessed through an associated third party network API 105, as well as other subroutines, communication protocols, and tools for building software.

The third party network 104 may comprise of a third party network application programming interface API 105, a third party module 106, and a third party database 107. Third party module 106 may input data (e.g., keyword or phrase) to initiate a creativity tool on the third party network 104 and then outputs the results to the ideation module 112. Third party database 107 may store data (e.g., associated with a creativity tool).

Figure 2:
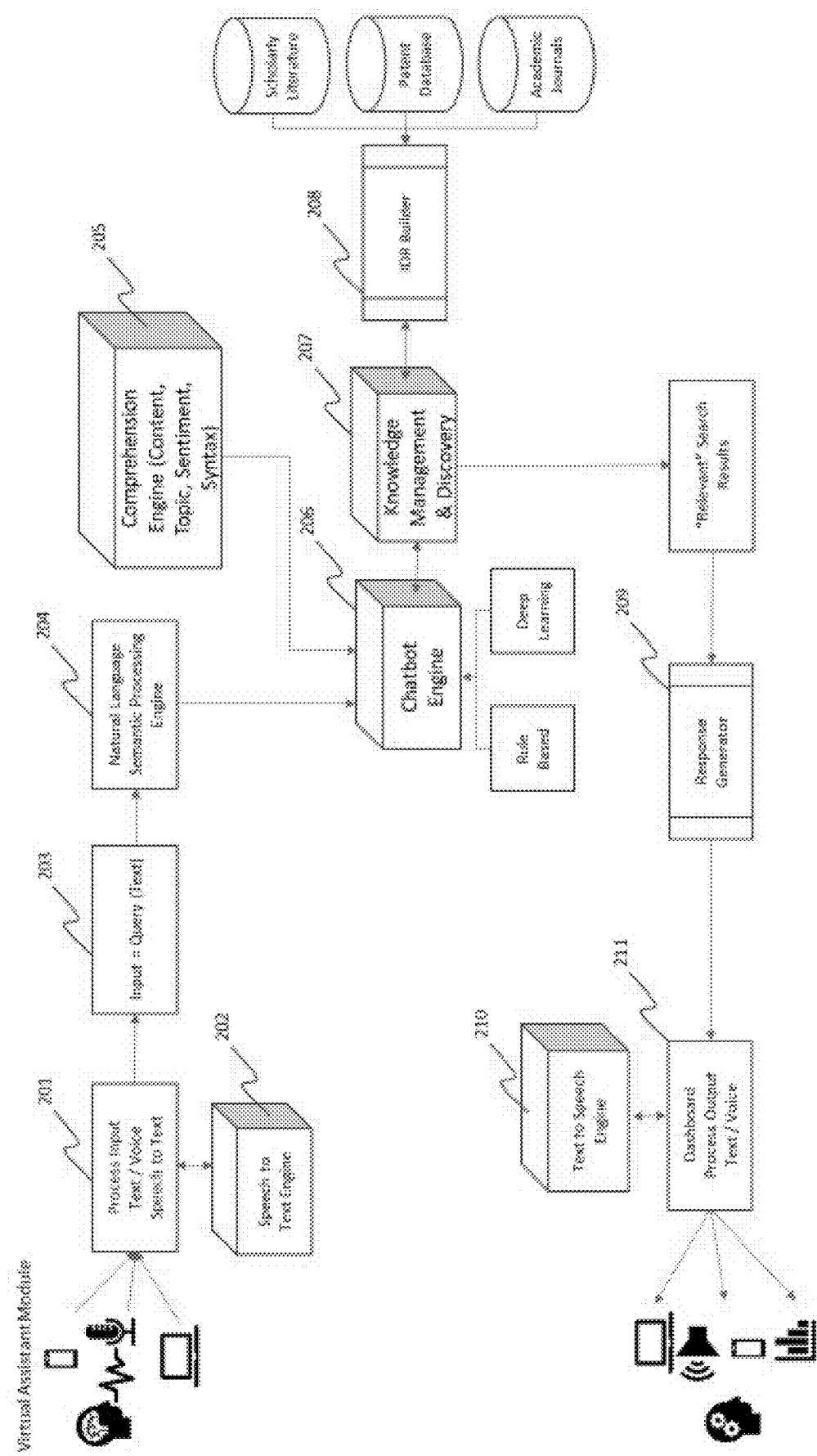
FIG. 2 illustrates an exemplary system for intelligence-driven virtual assistant for automated documentation and invention management.

FIG. 2 illustrates an exemplary system for intelligence-driven virtual assistant for automated documentation and invention management. Referred to herein as the ideation module 112, the ideation module 112 may include the exemplary components and perform the exemplary steps discussed herein.

In step 201, keywords may be received from the virtual assistant module 110 and provided to a speech-to-text engine 202 (or transcription module 119) that may process the text (e.g., based on predetermined rules, rules databases, and/or deep learning) to automatically produce a formatted and conforms to the rules of spelling, grammar, and punctuation. In addition, where the speaker(s) may be using specialized, technical, or otherwise unfamiliar words, speech-to-text engine 202 may be updated to expand upon a current speech recognition vocabulary. The speech-to-text engine 202 may further be able to recognize different speaker's voices and attribute the transcribed text appropriately.

In step 203, the text may be processed, and in step 204, the natural language processing (NLP) engine 204 may be used to recognize the intent of the text. Recognition of the intent may be used to build applications with highly engaging user experiences and lifelike conversational interactions.

Comprehension engine 205 may operate in conjunction with NLP engine 204 and machine learning to find insights, relationships, and other patterns in text. As such, NLP engine 204 and comprehension engine 205 may evaluate the language of the text; extract key words, phrases, places, people, brands, events, etc., and determine an intent (e.g., how positive or negative) indicated by the text. The text may further be analyzed (e.g., using tokenization and parts of speech), as well as automatically organized into files (e.g., by topic). In addition, the speech and associated text may be subject to a range of different text analysis applications and associated APIs, including voice analysis, intelligent document search, and content personalization and filtering.

A chatbot engine 206 provides a conversational experience for interaction with user correspondents. A correspondent can type a question, and the chatbot engine 206 may interpret the question, identify an answer, and then output the answer, whether verbally or by text or graphical data. Chatbot engine 206 can be built to respond to either voice or text in the language native to the user. In addition, chatbot engine 206 may have access to various tools for semantic search and analysis of insights and relationships between a given idea and background data (e.g., from scholarly literature, patent databases, and academic journals). Chatbot engine 206 may also access tools for artificial intelligence and machine learning to identify patterns and make decisions. Chatbot engine 206 may be used in conjunction with virtual assistant module 110 to communicate in a variety of different ways with one or more users in a given ideation session. As such, different types of communications from the user(s) may be processed by either or both, as well in as in conjunction with deep learning, NLP engine 204, and comprehension engine 205.

A knowledge management and discovery module 207 may use comprehension insights from comprehension engine 205 to organize and categorize data (e.g., in files or documents). Such categorization may be based on topic or other relationship for easier discovery and retrieval. The knowledge management and discovery module 207 may further personalize content recommendations for the user(s) by recommending content related to the same topic from scholarly literature, patent databases, academic journals, or other content sources.

A document may be built based on the data organized by knowledge management and discovery module 207. In some embodiments, such document may be an invention disclosure record (IDR) generated by an IDR builder 208. IDR builder 208 may access and review data from various sources (e.g., scholarly literature, patent databases, academic journals, etc.). Such review may occur during an ideation session to formulate queries and prompts for further idea development and expansion.

Response generator module 209 may be executed to generate appropriate responses to the user (e.g., via a text-to-speech synthesizer engine 210). In some embodiments, such response may include text, graphical data, retrieved data, files, or documents, etc., may be output and presented (e.g., displayed, played) to the user. Various embodiments of such display may include a dashboard 211 that organizes the presented data. Text-to-speech synthesizer engine 210 may use advanced deep learning technologies to synthesize speech that sounds like a human voice. Dashboard 211 may be a context-sensitive and capable of interacting with the user(s) participating in an ideation session.

Figure 3:
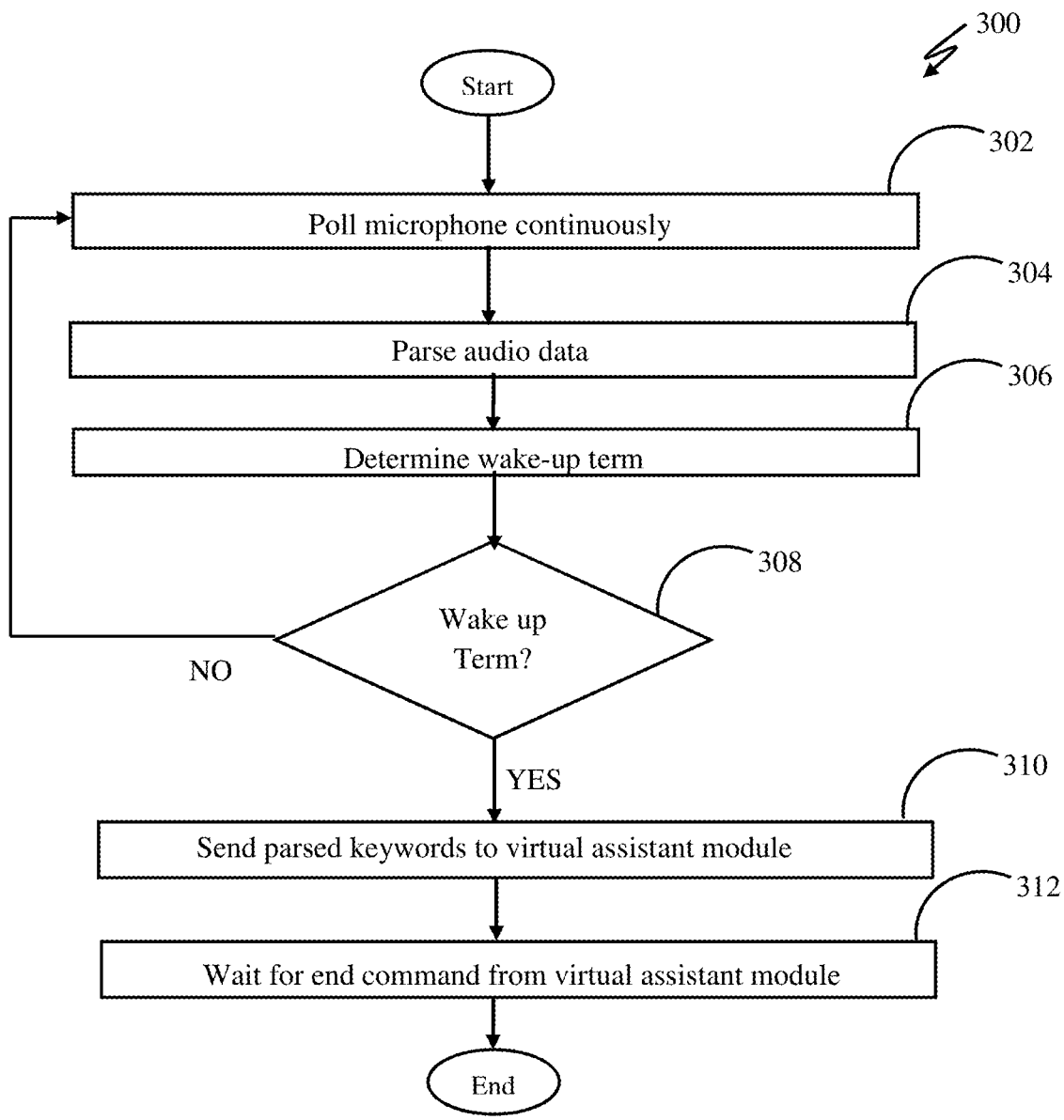
FIG. 3 is a flowchart illustrating an exemplary method of a wake-up module.

FIG. 3 is a flowchart illustrating an exemplary method 300 of a wake-up module 134. One skilled in the art may appreciate that, for this and other processes and methods disclosed herein, the specific steps illustrated may be performed or implemented in differing order.

In step 302, the wake-up module 134 may poll the microphone 129 continuously. In some embodiments, the wake-up module 134 may poll for a wake-up term detected in recording data. Such wake-up term may be a predefined keyword, phrase, invocation, or other audio-based trigger.

In step 304, the wake-up module 134 may parse audio data. The audio data may be parsed to individual terms, and in step 306, the wake-up module 134 may determine wake-up term. In step 308, the wake-up module 134 may determine whether the wake-term term is received or not received. If the wake-up term is identified as not having been received, the wake-up module 134 may again poll the microphone 129 continuously by reverting to step 302.

When the wake-up term is identified as having been received, the wake-up module 134 may send parsed keywords to virtual assistant module 110 in step 310. In step 312, the wake-up module 134 may wait for end command from virtual assistant module 110. In some embodiments, the wake-up module 134 may wait for a predetermined time period to receive a reply from the virtual assistant module 110.

Figure 4:
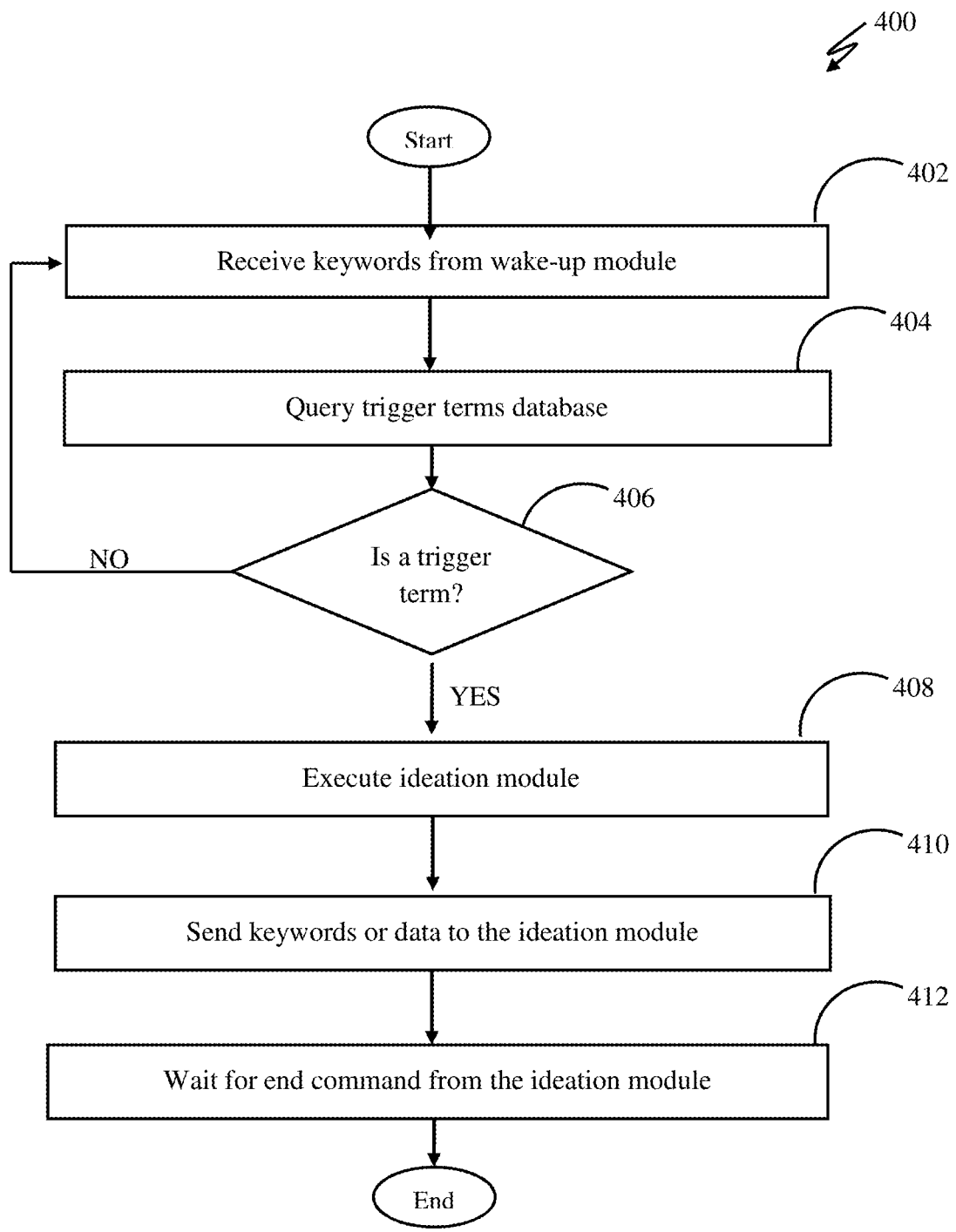
FIG. 4 is a flowchart illustrating an exemplary method for triggering a virtual assistant.

FIG. 4 is a flowchart illustrating an exemplary method 400 for triggering a virtual assistant. In step 402, virtual assistant module 110 may receive keywords from the wake-up module 134. In some embodiments, the keywords may be received by the virtual assistant module 110.

In step 404, the virtual assistant module 110 may query trigger terms database, and in step 406, the virtual assistant module 110 may identify a trigger term. In some embodiments, the received keywords may be compared to trigger terms in the trigger terms database 111. When no trigger term is identified, the method 400 may return to step 402 for further querying by virtual assistant module 110 for keywords from the wake-up module 134.

When a trigger term is identified, the method may proceed to step 408 in which the virtual assistant module 110 may execute the ideation module 112. For example, a trigger term such as "ask chatbot" may be used to trigger execution of the ideation module 112 by virtual assistant module 110. In some embodiments, a preprogrammed response or sound may be sent to the user through the speaker 130 of the virtual assistant device 102.

In step 410, the virtual assistant module 110 may send keywords or data to the ideation module 112, and in step 412, the virtual assistant module 110 may wait for an end command from the ideation module 112.

Figure 5:
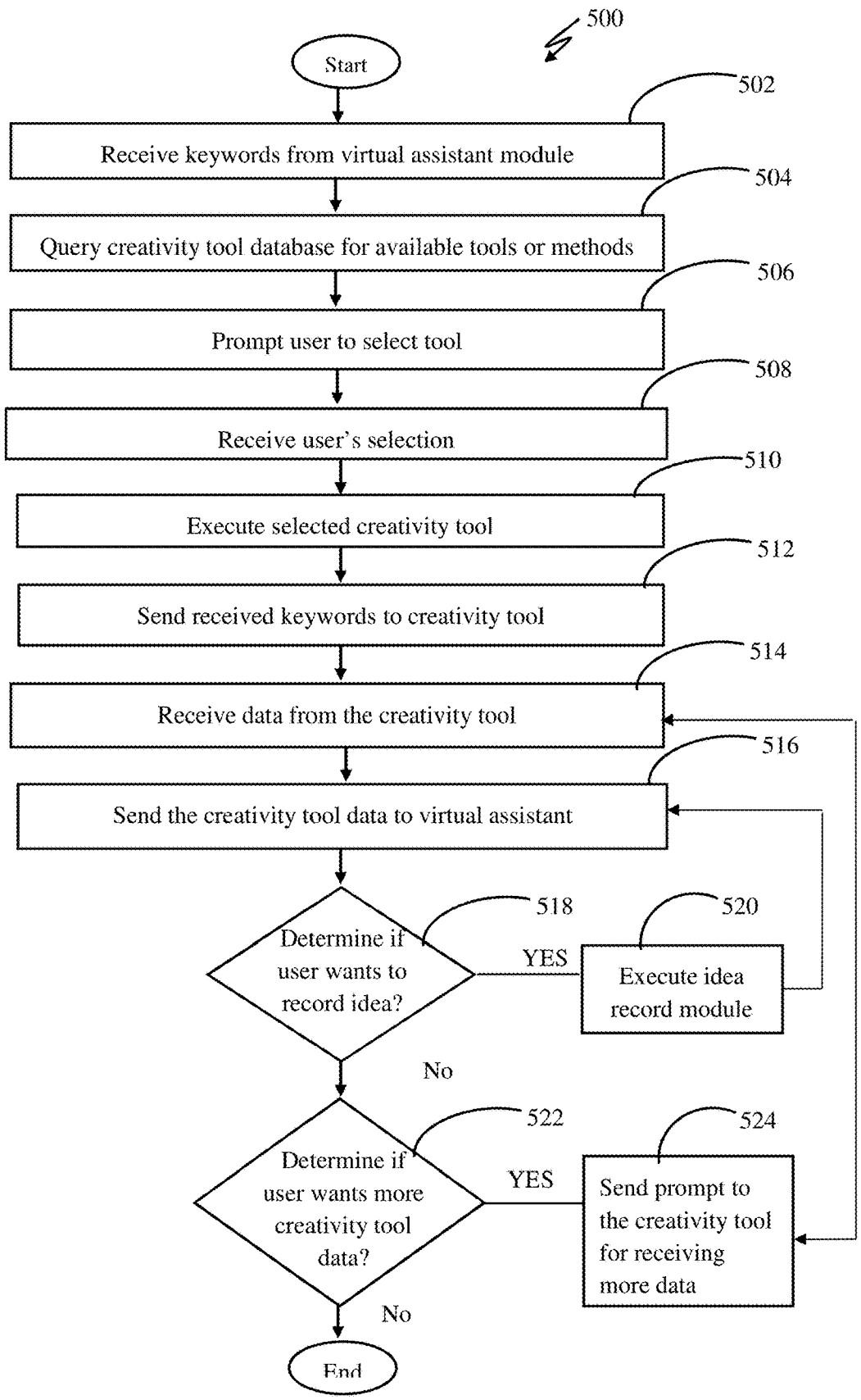
FIG. 5 is a flowchart illustrating an exemplary method for intelligence-driven documentation of creative data.

FIG. 5 is a flowchart illustrating an exemplary method 500 for intelligence-driven documentation of creative data. Such method 500 may be performed when ideation module 112 is executed.

In step 502, ideation module 112 may receive keywords from the virtual assistant module 110, and in step 504, the ideation module 112 may query creativity tool database 122 to check availability of creativity tools (e.g., creativity tools 1-*n* 116-117). Such query may be based on current discussion in a brainstorming session, current user participants, predefined preferences, etc.

Available creativity tools may be presented for selection in step 506. The ideation module 112 may prompt user to select from a menu of tools. The user may be prompted, for example, on the virtual assistant device 102 to select the tool or method liked by the user. In some embodiments, the user may also request specific types of brainstorming activity or specific tools, such as tools for word association, word definition, etc. Alternatively, the ideation module 112 may select a creativity tool at random. Some embodiments allow for the user or administrator to set up pre-programmed options or preferences on the virtual assistant device 102 regarding which tools are available and presented to the user(s) in the brainstorming session.

Table 2 below illustrates exemplary data stored in the creativity tools database 122. The creativity tools database 122 may store information regarding the available creativity tools, and such information may include the creativity tool name, brief description, a specific module associated with accessing and executing the creativity tool, and third party networks where the creativity tool may be accessed.

TABLE 2

| Creativity tool name | Creativity tool description | Creativity tool module | Creativity tool third party |
|---|---|---|---|
| Randomized Creativity | The randomized creativity tool randomly select different available creativity tools | Random tool module | Third party network 1<br>Third party network 2<br>—<br>Third party network n |
| Word association | The word association tool uses a given word or phrase and using an API accesses a database of associated words or synonyms | Creativity tool 1 module 116 | Third party network 1 |
| — | — | — | — |
| Creativity tool n | Creativity tool n description | Creativity tool n module 117 | Third party network n |

In step 508, the ideation module 112 may receive a user selection. Such user selection may occur verbally and may be detected as audio data captured using the microphone 129 of the virtual assistant device 102.

In step 510, the ideation module 112 may execute selected creativity tool. For example, the user may select creativity tool 1, which corresponds to creativity tool 1 module 116. As such, ideation module 112 may execute creativity tool 1 module 116.

In step 512, the ideation module 112 may send received keywords to creativity tool 1 module 116, and in step 514, the ideation module 112 may receive data or keywords back from the creativity tool 1 module 116.

In step 516, the ideation module 112 may send the creativity tool data to the virtual assistant device 102, and in step 518, the ideation module 112 may prompt the user to determine whether the user wishes to record an idea. While the user accepts the prompt to record the idea, the ideation module 112 may execute idea record module 118 in step 520.

If the user does not accept the prompt to record the idea, the ideation module 112 may further determine in step 522 if the user wishes to be presented with more creativity tool data such as may be elicited from continuing or re-executing creativity tool 1 module 116 (or another creativity tool module).

If the user accepts the prompt to be presented with more creativity tool data, the ideation module 112 may send prompts to the creativity tool 1 module 116 to request more data in step 524. If the user does not accept the prompt to hear more creativity tool data, the method may end, and execution of the ideation module 112 may be terminated.

Figure 6:
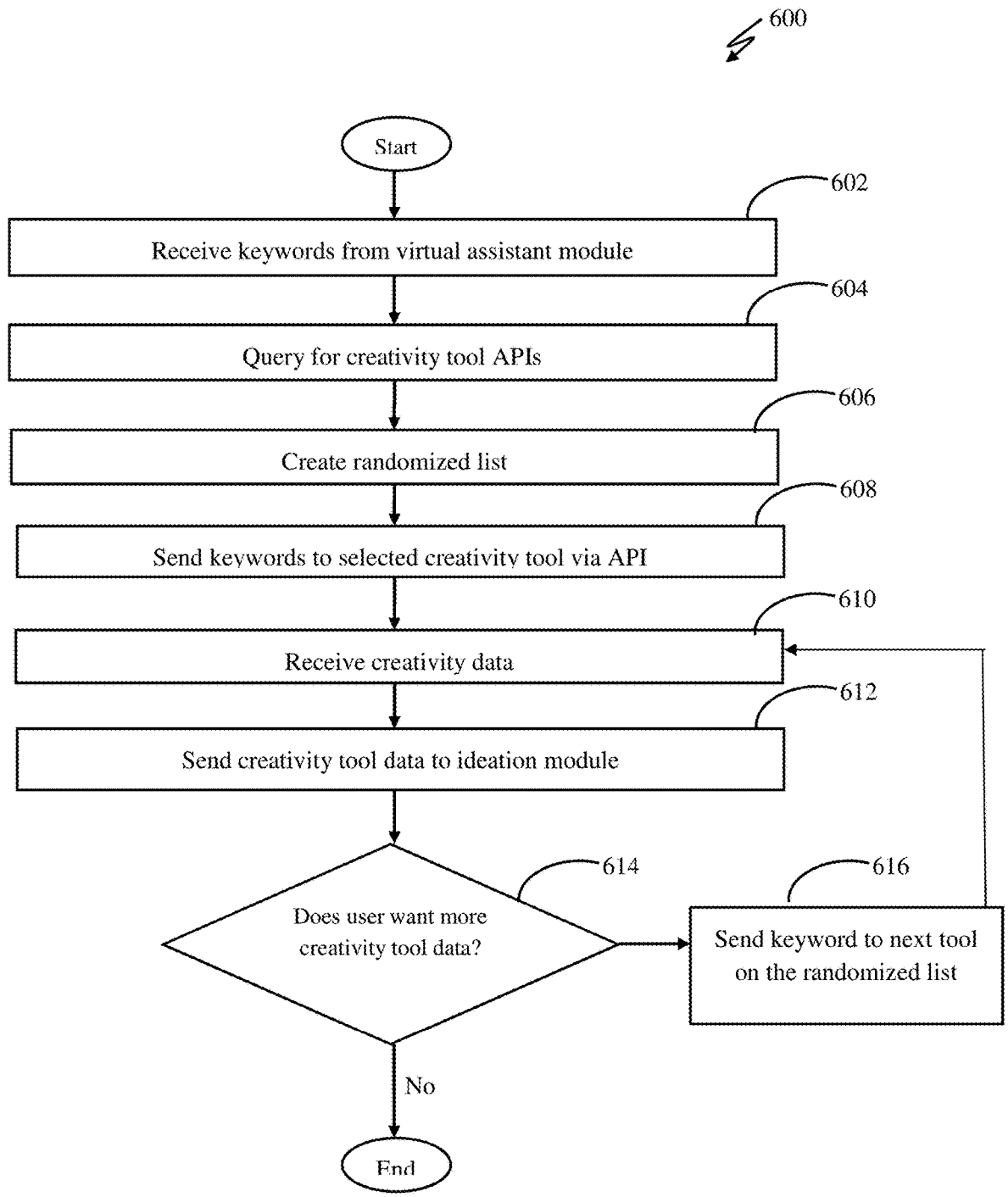
FIG. 6 is a flowchart illustrating an exemplary method for randomization of creativity tool selection.

FIG. 6 is a flowchart illustrating an exemplary method 600 for randomization of creativity tool selection. Such method 600 may result from execution of a random tool module.

In step 602, a random tool module may receive keywords from the virtual assistant module 110, and in step 604, the random tool module may query API database 123. In some embodiments, the API database 123 may be queried for available APIs for specified creativity tools.

In step 606, the random tool module may create a list of creativity tools in randomized order. In some embodiments, the APIs associated with the creativity tools may be stored in the API database 123.

In step 608, the random tool module may send keywords to a creativity tool n module 117 via a first API, and in step 610, the random tool module may receive creativity data. For example, a user may wish to brainstorm ideas for shovels, and the keyword "shovels" be provided to a creativity tool 1 module 116 selected by the random tool module The activity guided by the creativity tool 1 module 116 may include word association. For the next session, the random tool module may select another tool (e.g., involving word definition) from the randomized list.

In step 612, the random tool module may send creativity tool data to ideation module 112, and in step 614, the random tool module may determine whether user wishes to receive more creativity tool data.

If the user indicates a wish for more creativity tool data, the method may proceed to step 617 where the random tool module may send keyword (via the associated API) to the creativity tool n module 117 associated with the next creativity tool on the randomized list. If the user does not wish to continue use of the creativity tool, execution of the random tool module may be terminated.

Table 3 below illustrates exemplary data stored in the API database 123. The API database 123 may store data regarding various available APIs. Such data may include the API ID (e.g., an identification number or other identifier). The API database 123 may also store descriptions of the API and associated tool/module, third party networks 108 (and associated third party network API 105) from which the API may be accessed, and API data parameters or requirements for the data to be sent via the API.

TABLE 3

| API ID | API Name | API description | Third party network | API data parameters |
|---|---|---|---|---|
| API001 | Word association tool | Connect to a word association tool where a keyboard, term or phrase is inputted and the tool provides associated terms or synonyms | Third party network | Input: keyword |
| API002 | Definition tool | The tool connects to a network that provides the definition of a keyword, term or phrase. | Third party network | Input: keyword |
| — | — | | | |
| API n | Creativity tool n | Description of APN n | Third party network | Input: API input x |

Figure 7:
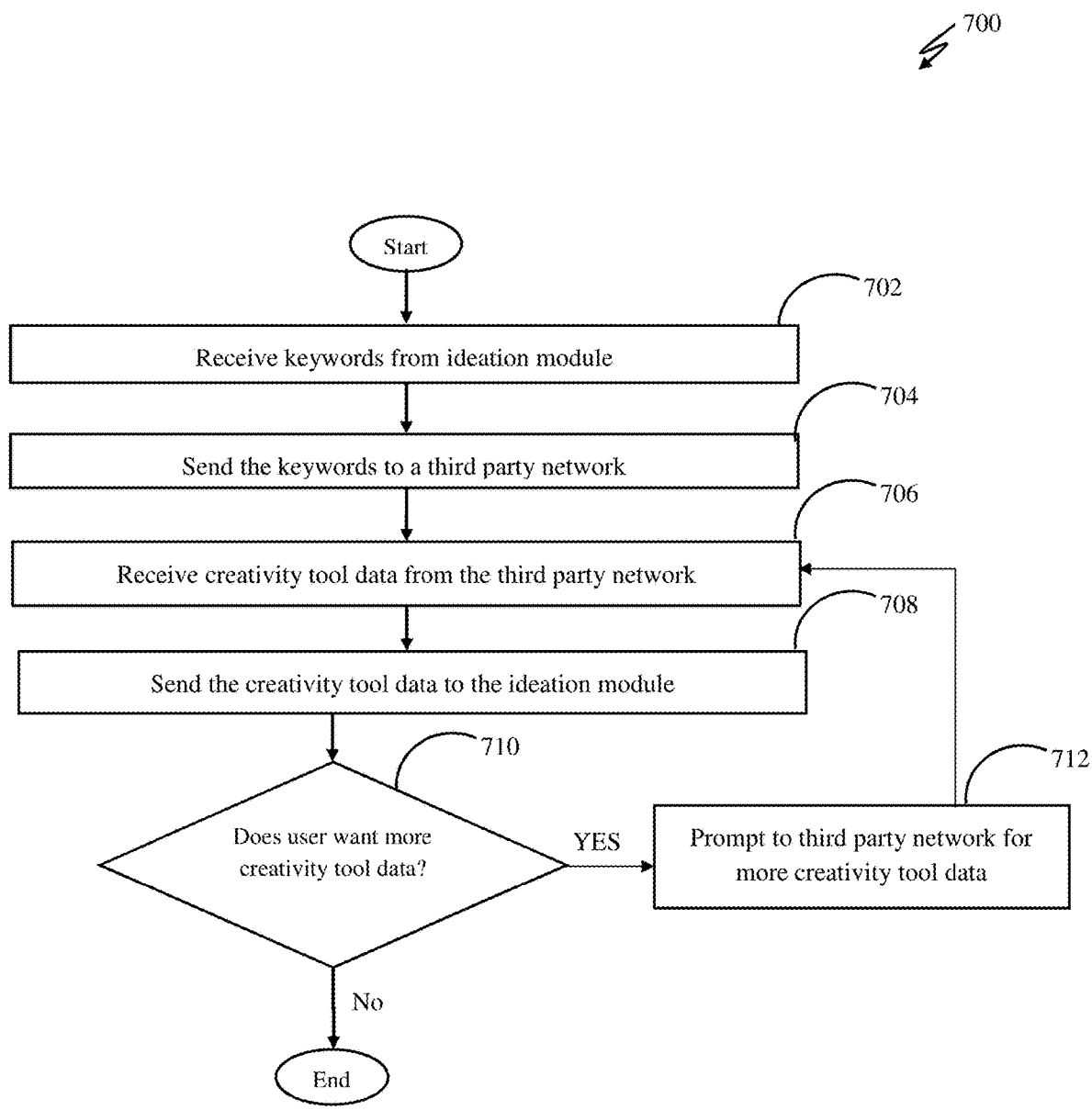
FIG. 7 is a flowchart illustrating an exemplary method for integrating a creativity tool.

FIG. 7 is a flowchart illustrating an exemplary method 700 for integrating a creativity tool. Such method 700 may be performed when creativity tool 1 module 116 is executed.

In step 702, the creativity tool 1 module 116 may receive keywords from the ideation module 112. In some embodiments, creativity tool n module 117 may also be triggered by the ideation module 112, along with any number of other creativity tools. For example, the ideation module 112—at random, based on user input, or other basis—may select one or a combination of different types of creativity tools to execute in conjunction.

In step 704, the creativity tool 1 module 116 may send the keywords to the third party network 108, and in step 706, the keywords may be sent through a third party network API 105 to third party network 108, which stores at least one creativity tool in third party module 106 and or creativity tool data in third party database 107.

In step 706, the creativity tool 1 module 116 may receive the creativity tool data from the third party network 104, and in step 708, the creativity tool 1 module 116 may send the creativity tool data to the ideation module 112.

In step 710, the creativity tool 1 module 116 may determine whether user wishes to receive more creativity tool data, and if the user indicates a wish to receive more creativity tool data, the method may proceed to step 712 where creativity tool 1 module 116 may prompt the third party network 104 for sending more creativity tool data. In some embodiments, the creativity tool data may be related to the keywords sent to the third party network 104. If the user does not indicate a wish to receive more creativity tool data, execution of the creativity tool 1 module 116 may be terminated.

Figure 8:
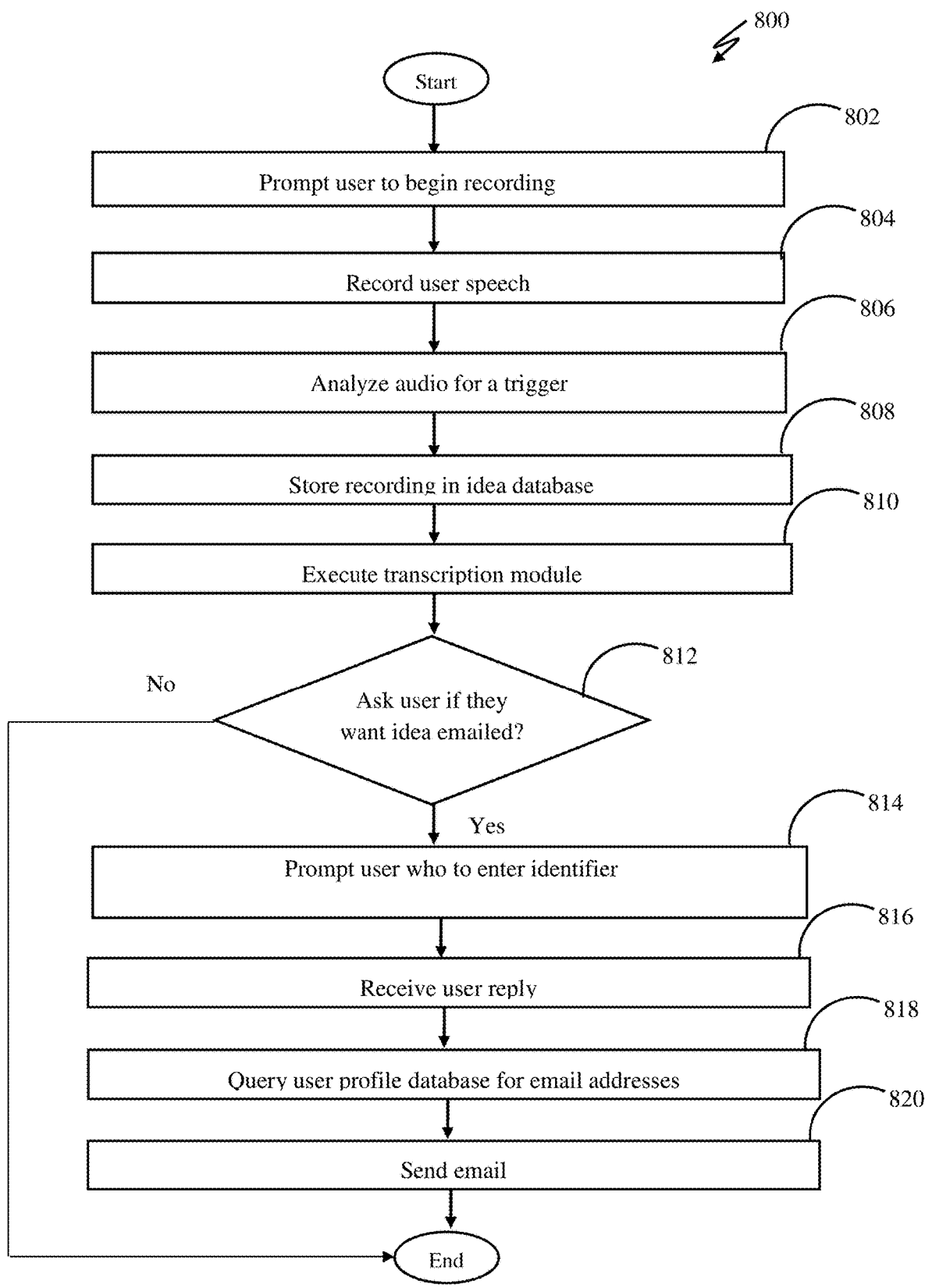
FIG. 8 is a flowchart illustrating an exemplary method for processing recording-based creation data.

FIG. 8 is a flowchart illustrating an exemplary method 800 for processing recording-based creation data. Performance of method 800 may result from execution of idea record module 118.

In step 802, idea record module 118 may prompt the user(s) to begin recording. Such prompt may be triggered by the ideation module 112 (e.g., based on detection of certain keywords).

In step 804, the idea record module 118 may record user speech as audio data using microphone 129 of the virtual assistant device 102, and in step 806, the idea record module 118 may analyze the audio data for a trigger phrase, keyword or invocation. In some embodiments, the audio data may be analyzed for a trigger term that stops the recording by idea record module 118.

In step 808, the idea record module 118 may store the recording in idea database 120, and in step 810, the idea record module 118 may execute transcription module 119. In some embodiments, the transcription module may be executed upon storing the recording in the idea database 120.

Table 4 below illustrates exemplary data stored in the idea database 120. The idea database 120 may store information regarding identified ideas. Such stored information may include an identifier (ID) or identification number, an audio file section for storing recorded audio files associated with the idea, a text transcription section for storing transcribed text of audio file, a date section for storing date(s) associated with the idea, and a user section for storing the name or other identifier of the user(s) participating in the session during which the idea was identified and discussed.

TABLE 4

| Idea ID | Audio file | Text transcription | Date | User |
|---|---|---|---|---|
| 001 | 001.wav | The idea here is to have a pencil that can write by itself | Jul. 31, 2018 | John Smith |
| 002 | 002.wav | The widget should be improved using multiple sensor such as temperature and optical sensor | Jul. 31, 2018 | Jane Doe |
| 003 | 003.wav | This new idea would improve on current computer mouse technologies by putting a heater in the mouse to warm users hand | Jul. 31, 2018 | Jeff Jackson |

TABLE 4-continued

| Idea ID | Audio file | Text transcription | Date | User |
|---|---|---|---|---|
| 004 | 004.wav | — | Jul. 31, 2018 | John Smith |
| 005 | 005.wav | — | Jul. 31, 2018 | John Smith |

In step 812, the idea record module 118 may prompt the user to determine whether the user wishes to receive an email, and if the user indicates a wish to receive the email, the idea record module 118 may prompt the user in step 814 to enter a name or other identifier. If the user does not indicate a wish to receive email, the method may end.

In step 816, the idea record module 118 may receive a user reply with the requested name or identifier, and in step 818, the idea record module 118 may query user profile database 121 for the email address associated with the name or identifier.

In step 820, the idea record module 118 may send the email. In some embodiments, the email may be composed with audio recording and transcribed text in the body of the email.

Table 5 below illustrates exemplary data stored in the user profile database 121. The user profile database 121 may comprise store various types of information regarding each user, including a unique identifier (ID) or identification number, a user name section for storing the full name of the user (whether combined into a single field or separated into multiple fields), a user email section for storing the user email address, and a title section for storing a current job title or position in the organization.

TABLE 5

| User ID | User name | User email | Title |
|---|---|---|---|
| 1001 | John smitch | jsmith@ABC.com | Founder & CEO |
| 1002 | Jane doe | jdoe@ABC.com | Chief inventor |
| 1003 | Bob martin | bmartin@ABC.com | Sales |
| 1004 | Jeff jackson | jjackson@ABC.com | Engineer |

Figure 9:
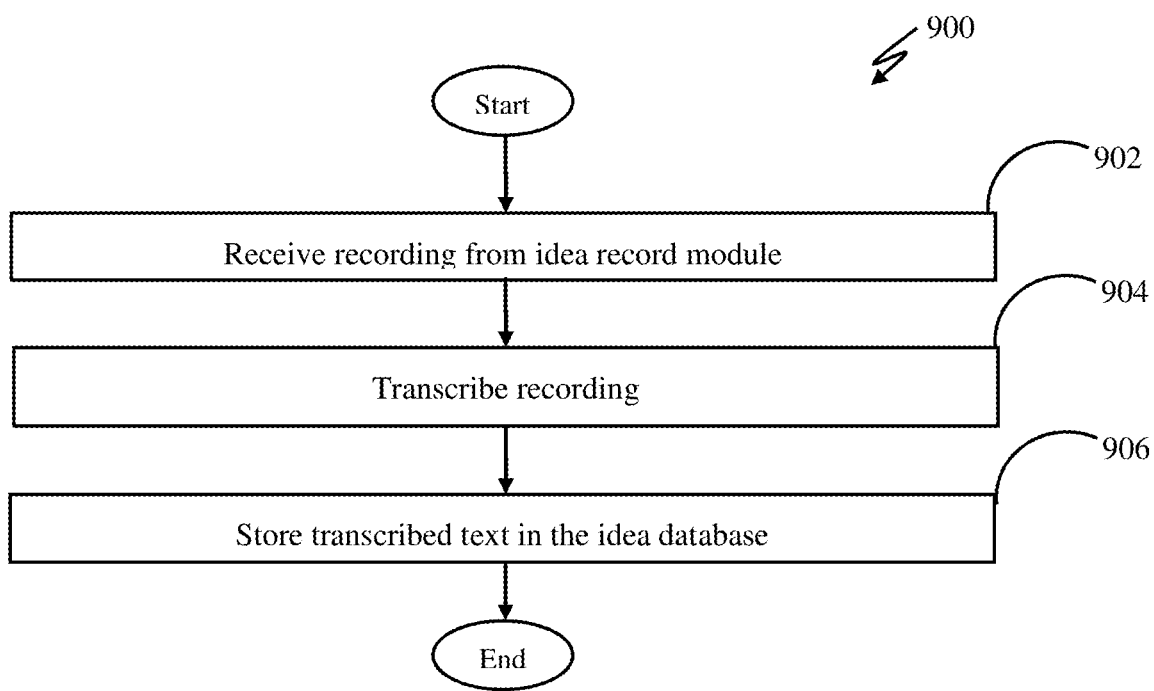
FIG. 9 is a flowchart illustrating an exemplary method for processing transcription-based creation data.

FIG. 9 is a flowchart illustrating an exemplary method 900 for processing transcription-based creation data. Performance of method 800 may occur as a result of executing transcription module 119.

In step 902, transcription module 119 may receive a recording from idea record module 118, and in step 904, the transcription module 119 may transcribe the recording.

In step 906, the transcription module 119 may store the transcribed text in the idea database 120.

Figure 10:
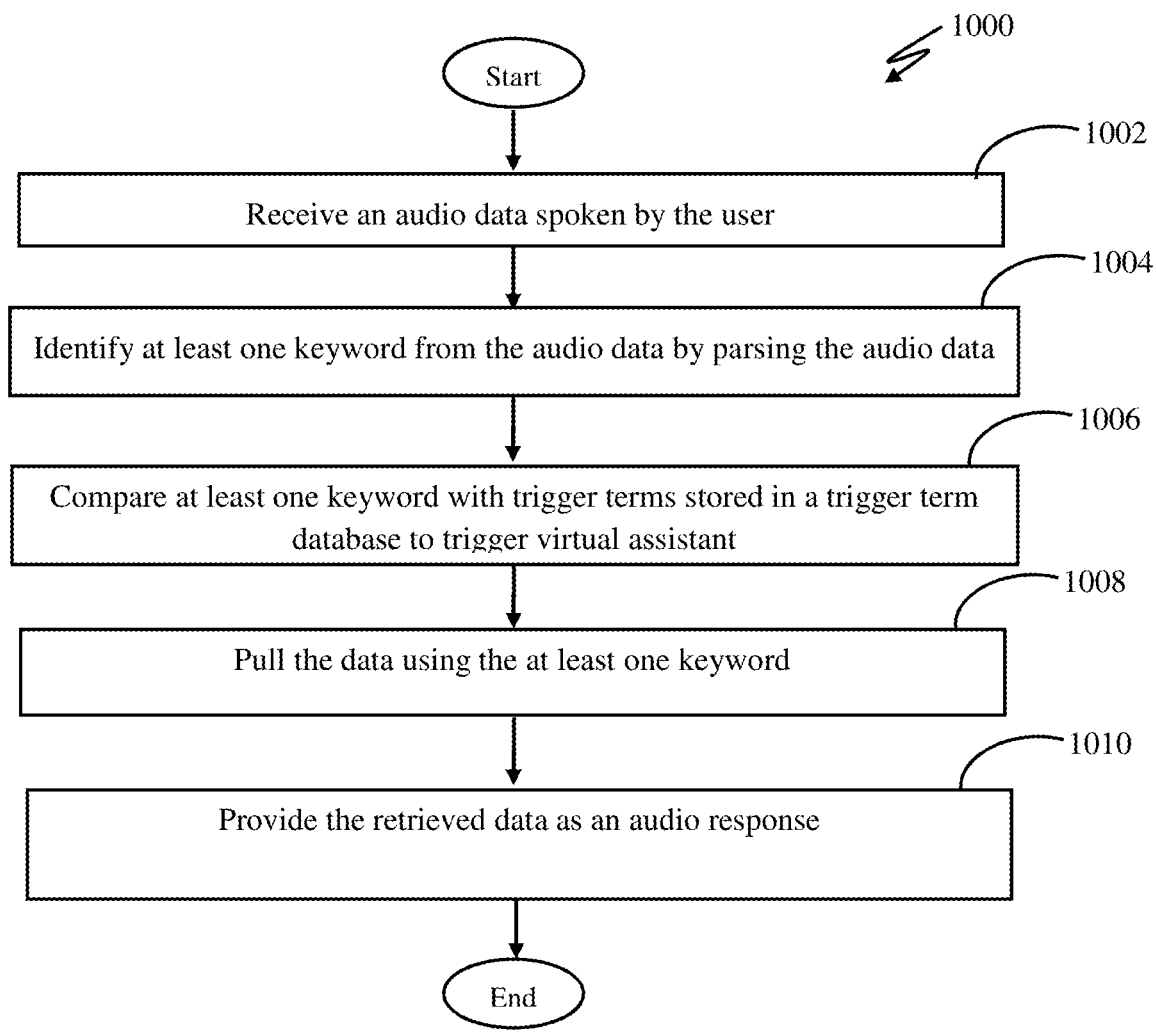
FIG. 10 is a flowchart illustrating an exemplary method for utilizing a virtual assistant to process audio-based creation data.

FIG. 10 is a flowchart illustrating an exemplary method 1000 for utilizing a virtual assistant device 102 to process audio-based creation data.

In step 1002, an audio data spoken by a user may be received by a microphone 129, and in step 1004, at least one keyword from the audio data may be identified by virtual assistant device 102, which is used to parse the audio data.

In step 1006, the virtual assistant device 102 may compare at least one keyword to trigger terms in trigger term database 111.

In step 1008, the data may be retrieved based on the keyword by virtual assistant device 102 from third party network 104 using at least one third party network API 105. In some embodiments, the at least one third party network API 105 may be associated with third party creativity tools, databases, and web tools.

In step 1010, the data retrieved from the third party network 104 may be presented to the user by the virtual assistant device 102 as an audio response. In some embodiments, the data may include definitions or concepts associated with the at least one keyword.

Figure 11:
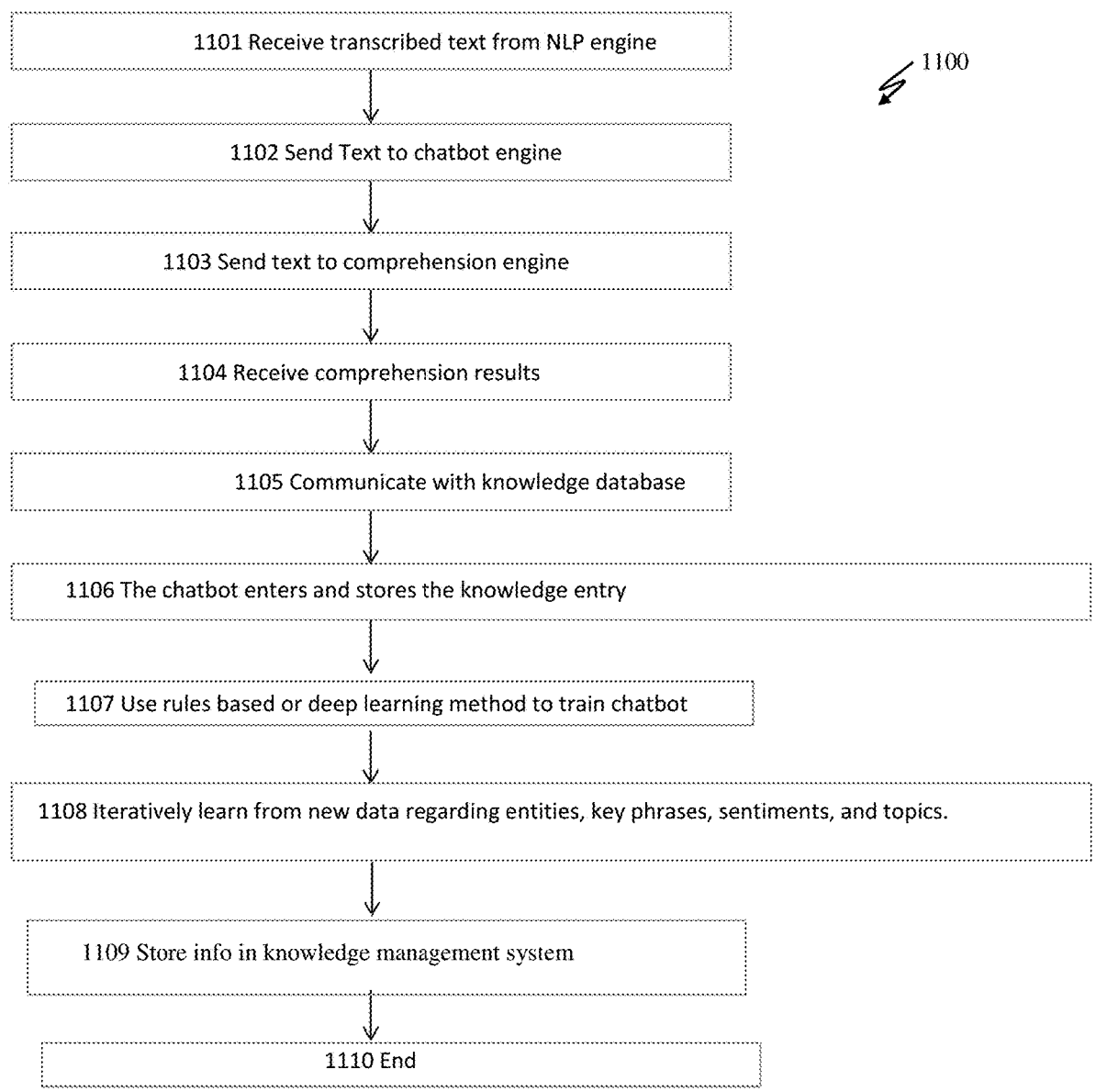
FIG. 11 is a flowchart illustrating an exemplary method of training a chatbot for comprehension.

FIG. 11 is a flowchart illustrating an exemplary method 1100 of training a chatbot for comprehension. Performance of method 1100 may result from execution of chatbot engine 206.

In step 1101, transcription module 119 or other speech-to-text engine 202 may be used to transcribe spoken words into text and sent to a natural language processing (NLP) engine 204 for analysis. Such results of such analysis may be provided to the various modules 113-117 of the ideation module 112, as well as stored in the databases 120, 112 of virtual assistant network 109.

In step 1102, the transcribed text may be presented to a chatbot engine 206, and in step 1103, the extracted text may be sent to a comprehension engine 205, where text may be broken down to the building blocks of a sentence and in step 1104 the comprehension engine 205 may return the content, topic, sentiment, and syntax results. In step 1105, the intermediate results may be stored in the knowledge database 207, and in step 1106, the chatbot engine 206 may enter and store the knowledge entry in one or more databases for future access and use by subsequent users.

In step 1107, the chatbot engine 206 may use existing rules, which may be updated and refined based on deep learning (or machine learning) to train the chatbot engine 206. In step 1108, the chatbot engine may further learn from new data based on application of deep learning techniques to continue refining the rules. As such, chatbot engine 206 may be continually gaining a deeper understanding of entities, key phrases, sentiments, and topics of interest to an enterprise, team, or individual user. In step 1109, the interim results may be stored into the knowledge management system 202.

Figure 12:
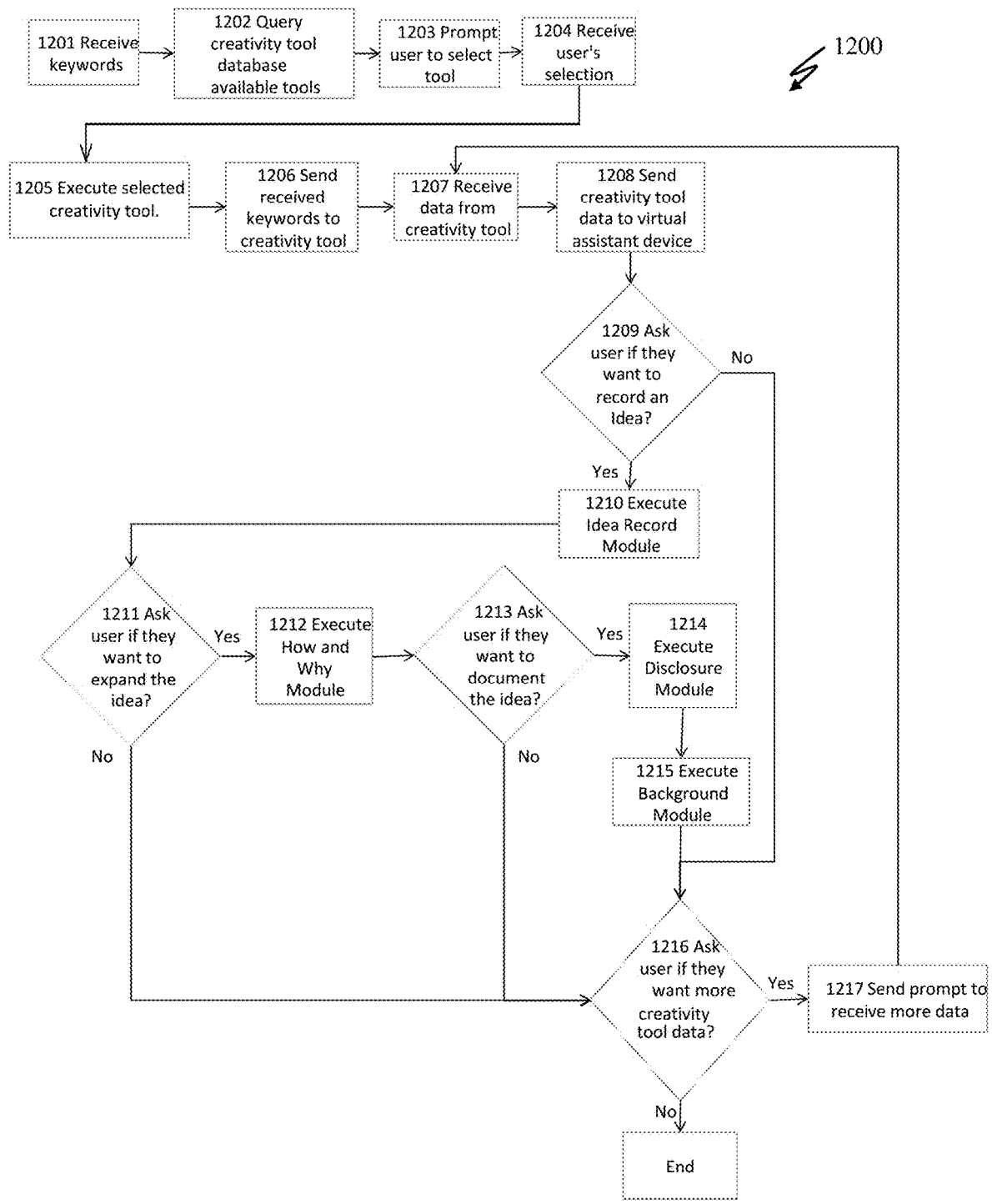
FIG. 12 is a flowchart illustrating an exemplary method for intelligence-driven virtual assistant for automated documentation.

FIG. 12 is a flowchart illustrating an exemplary method 1200 for intelligence-driven virtual assistant for automated documentation.

In step 1201, keywords may be sent from the virtual assistant module 110 to the ideation module 112, and in step 1202, the ideation module 112 may query the creativity tool database 122 for available creativity tools. Ideation module 112 may select a creativity tool randomly or based on specific user requests or preferences (e.g., for tools involving word association, word definition, etc.)

In step 1203, the ideation module 112 may provide—via virtual assistant module 110—a prompt the user(s) in a current brainstorming session to confirm selection of a creativity tool or to provide a different selection of a different creativity tool. In some embodiments, the ideation module 112 may be pre-programmed with certain options or preferences regarding what creativity tools to use. If so, the virtual assistant module 110 may present the pre-programmed options to the user(s).

In step 1204, the ideation module 112 may receive a creativity tool selection via audio detected by microphone 129 of the virtual assistant device 102, and in step 1205, the selected creativity tool 1 module 116 may be executed by ideation module 112. For example, the user may select creativity tool 1, which is associated with creativity tool 1 module 116.

In step 1206, the keywords received from the virtual assistant module 110 may be sent to the creativity tool 1 module 116. In some embodiments, execution of the creativity tool 1 module 116 may involve use of virtual assistant module 110 to detect and interpret speech so that creativity tool 1 module 116 may provide an interactive user experience.

In step 1207, the ideation module 112 may receive data or keywords back from the creativity tool 1 module 116, and in step 1208, the creativity tool data may be sent to the user via the virtual assistant device 102.

In step 1209, virtual assistant module 110 may ask the user(s) to confirm a wish to record an idea. If the user does not indicate a wish to record an idea, virtual assistant module 110 may ask the user(s) in step 1216 if they wish to be presented with more creativity tool data from the same creativity tool or from a different creativity tool. If the user wishes to be presented with more creativity tool data, the method may proceed to step 1217 in which the ideation module 112 may send a prompt to creativity tool 1 module 116 (or a module of another selected creativity tool) to send more creativity tool data, at which point, the method returns to step 1207.

If the user indicates a wish to record an idea, the method may proceed from step 1209 to step 1210 in which the idea record module 118 may be executed.

In step 1211, the virtual assistant module 110 may ask the user(s) if they wish to expand upon the idea, and if so, the method may proceed to step 1222 in which the "how and why" module 113 may be executed.

In step 1223, virtual assistant module 110 may ask the user(s) if they wish to document the idea, and if so, the method may proceed to step 1224 in which the disclosure module 114 may be executed.

In step 225, the ideation module 112 may execute the background module 116, and in step 1226, virtual assistant module 110 may ask the user(s) if they wish to hear more creativity tool data. Although the illustrated method 1200 illustrates that additional creativity tool data may return to step 1207, alternative embodiments may allow for the additional creativity tool data to be part of developing or expanding upon the same idea.

Figure 13:
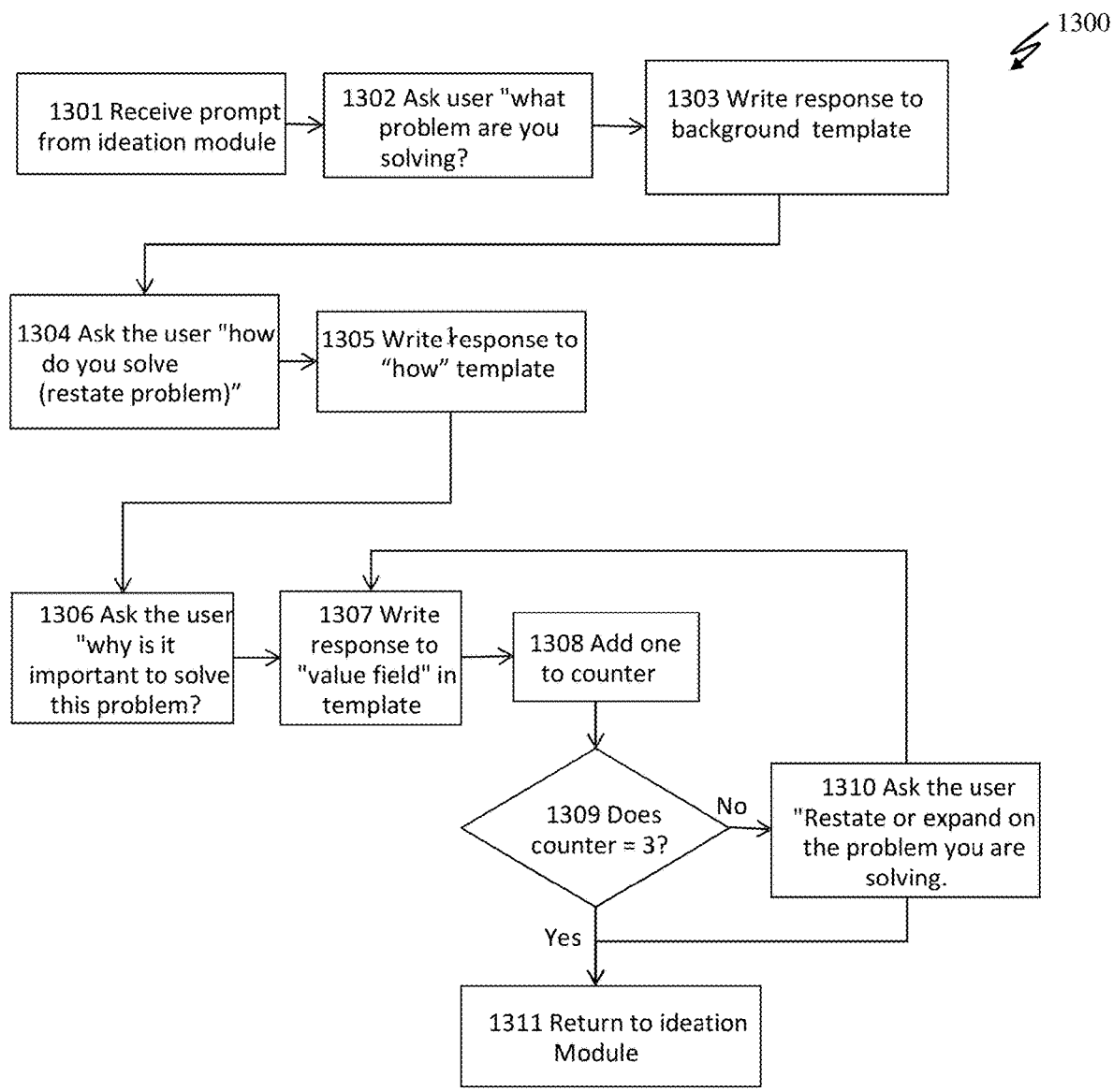
FIG. 13 is a flowchart illustrating an exemplary method for guided idea development.

FIG. 13 is a flowchart illustrating an exemplary method 1300 for guided idea development. Method 1300 may be performed when the "how and why" module 113 is executed.

In step 1301, the "how and why" module 113 may receive a prompt from the ideation module 112, and in step 1302, virtual assistant module 110 may be used to ask the user(s) various queries including queries regarding what problem the user is trying to solve. For example, where the idea involves shovels, the user may respond with "My shovel can do more work with less input strength from the user."

In step 1303, the response may be transcribed by transcription module 119 and processed by disclosure module 114 by inclusion in a report, which may be based on a template from the template database 125. Where the response is identified as pertaining to background data, for example, a template associated with background data may be selected from the template database 125 and its fields populated based on the transcribed response.

In step 1304, the "how and why" module 113 may use virtual assistant 110 to ask the user(s) how the problem is solved. The problem as voiced by the user in step 1302 may be reworded or rephrased based on an analysis of the originally voiced problem. For example, the problem above may be rephrased as how to make shovels more efficient.

In step 1305, the user response may likewise be transcribed by transcription module 119, analyzed by disclosure module, and used to populate a template from template database 125, and stored (e.g., as How 1-n.txt) in idea database 120.

In step 1306, virtual assistant module 110 may be used by "how and why" module 113 to ask the user(s) the significance of solving the problem (e.g., why the user(s) are seeking to make shovels more efficient). For example, the user may respond that a more efficient shovel may result in less repetitive stress injuries.

Such response may be transcribed by transcription module 119, analyzed by disclosure module 114 for inclusion in a report based on a template regarding value proposition, and stored (e.g., as Why 1-n.txt) in idea database 120 in step 1307.

In step 1308, "how and why" module 113 may add one to a counter, and in step 1309, the "how and why" module 113 may identify whether the counter meets 3 (or other defined value based on preference or goal).

If the counter has not yet reached the predetermined goal, the "how and why" module 113 may use virtual assistant module 110 to ask the user(s) to restate or expand on the problem, after which the method may return to earlier steps for further identification and exploration of the problems being solved and the value proposition of the solution.

If the counter has reached 3 or another predetermined goal, the method may return the user(s) to the ideation module 112.

Figure 14:
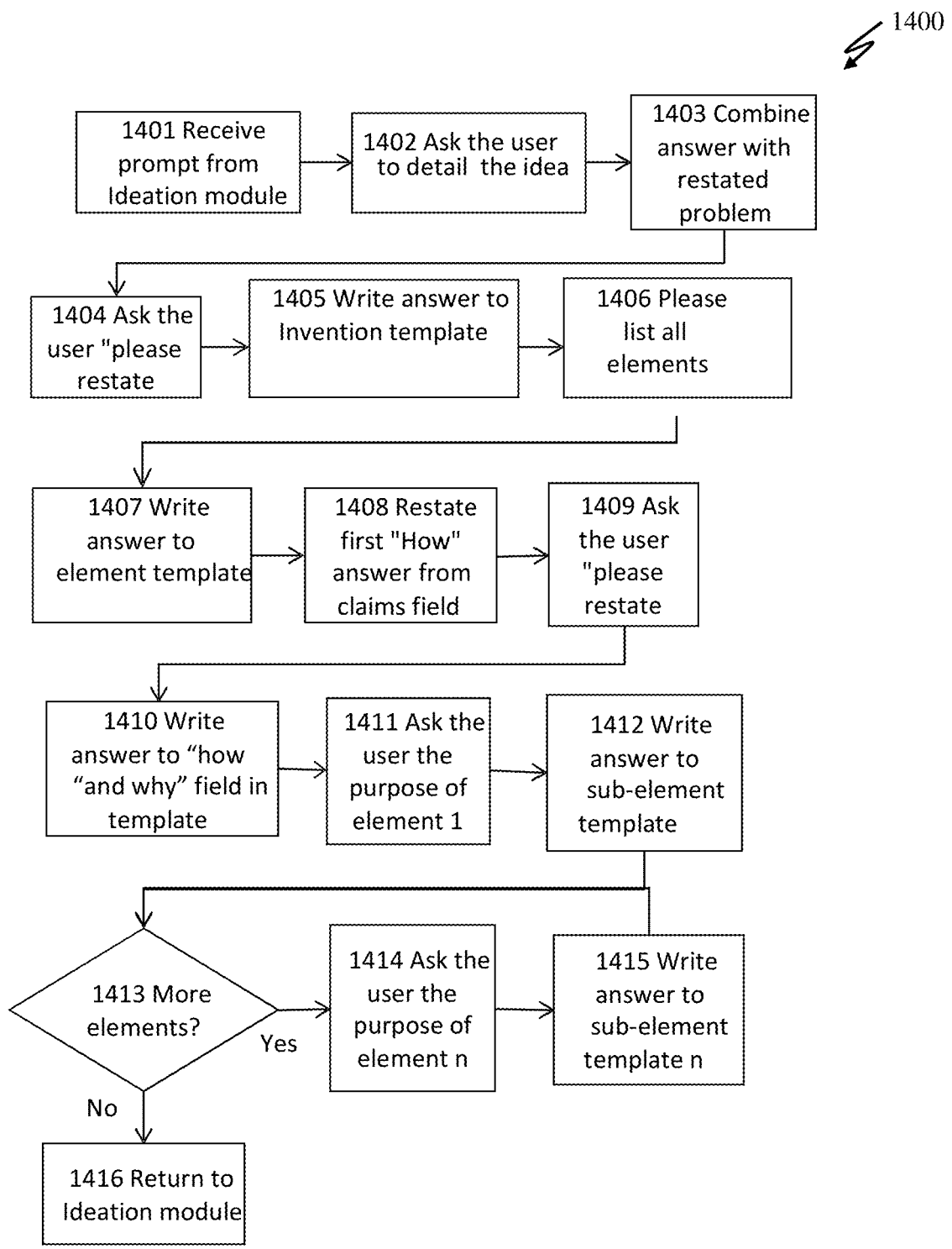
FIG. 14 is a flowchart illustrating an exemplary method for guided idea expansion.

FIG. 14 is a flowchart illustrating an exemplary method 1400 for guided idea expansion. Such method 1400 may be performed as a result of executing disclosure module 114.

In step 1401, the disclosure module 114 may receive a prompt from the ideation module 112, and in step 1402, the disclosure module 114 may use the virtual assistant module 110 to ask the user details about the idea. Referring to the shovel example above, the disclosure module 114 may ask the user(s) whether the idea is a new shovel design, a new shovel component, a new shovel accessory, or other feature that improves efficiency.

In step 1403, the disclosure module 114 may combine the responses to such queries with a restated version of the problem, and in step 1404, the disclosure module 114 may use virtual assistant module 110 to ask the user to confirm accuracy of the combination.

In step 1405, the combination may be used by disclosure module 114 to fill in a template (e.g., independent claim header field), and in step 1406, disclosure module 114 may use virtual assistant module 110 to ask the user(s) to list all the elements needed to make or operate the solution represented by the idea.

In step 1407, disclosure module 114 may write the responses to a template for elements. For example, the proposed shovel may be identified as being made with a vibrating motor, an actuator that adjusts the vibration, and a power pack.

In step 1408, disclosure module 114 may use virtual assistant module 110 to restate the first "how" answer and ask the user whether such restatement if accurate. If the user indicates that such restatement is not accurate, the disclosure module 114 may use virtual assistant module 110 to ask the user to restate the "how" in step 1409.

In step 1410, disclosure module 114 may write the answer to a template associated with sub-elements, and in step 1411, disclosure module 114 may use virtual assistant module 110 to ask the user the purpose of each element. In step 1412, disclosure module 114 may write the response to further templates associated with sub-elements.

In step 1413, disclosure module 114 may determine if there are more elements. If so, disclosure module 114 may use virtual assistant module 110 to ask the user the purpose of each other element in step 1414 and write the answer to a selected template. in step 1415.

In step 1416, the list of elements may be identified to have been exhausted, and the method may return to the ideation module 112.

Figure 15:
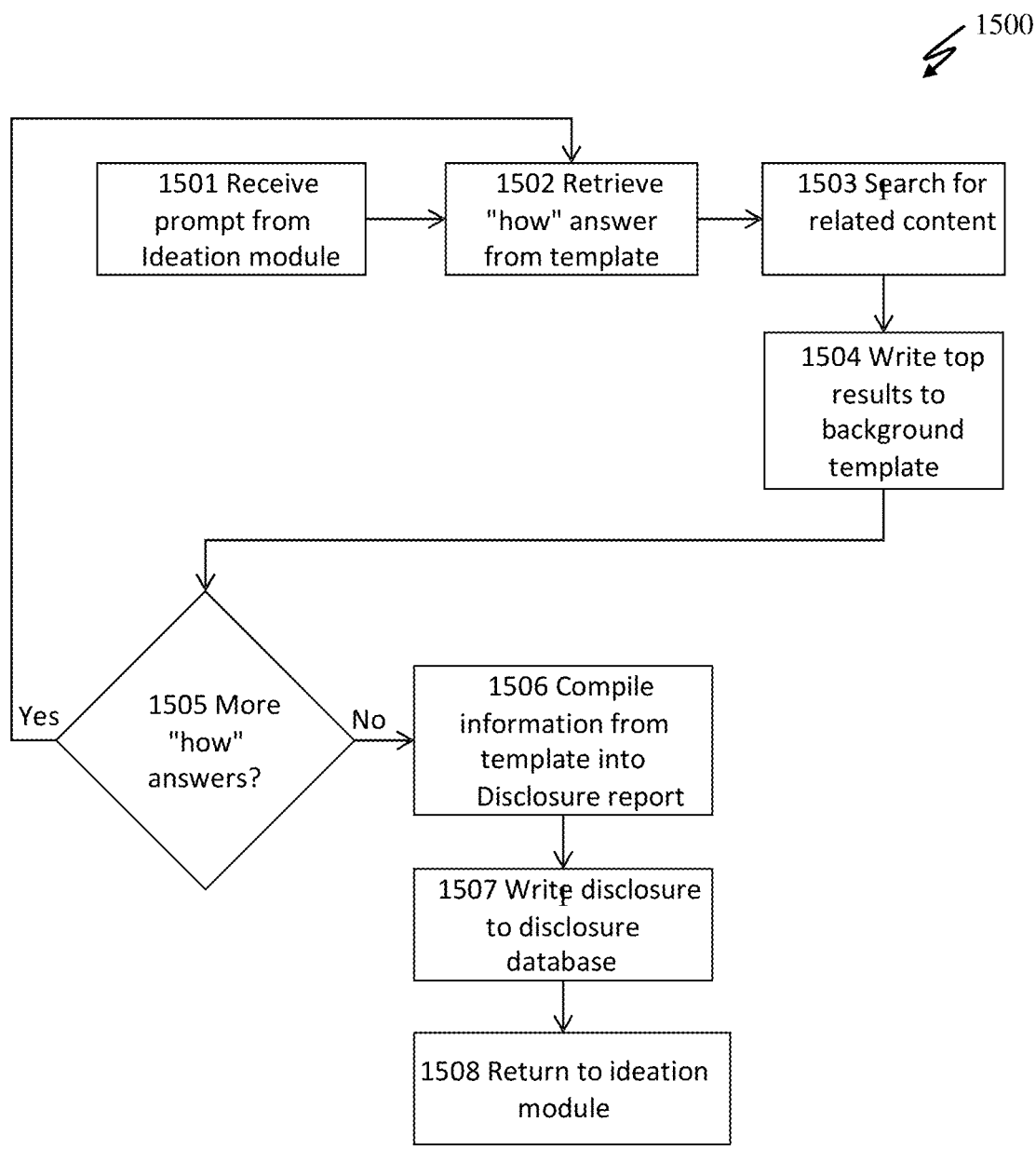
FIG. 15 is a flowchart illustrating an exemplary method for automated background documentation.

FIG. 15 is a flowchart illustrating an exemplary method 1500 for automated background documentation. Method 600 may be performed when background module 115 is executed.

In step 1501, background module 115 may receive a prompt from the ideation module 112, and in step 502, background module 115 may retrieve the user's answers to the "how" queries posed by the "how and why" module 113 and stored in idea database 120.

In step 1503, background module 115 may search third party networks 104 or other sources for information related to the current idea. Such third party networks 104 or other sources may include various databases of technical, scholarly, or academic data. The background module 115 may use natural language processing or other structured search.

In step 1504, background module 115 may evaluate the top search results (e.g., that meet a threshold level of overlap or similarity). Such evaluation may include using a tool for scoring similarity between the "how" answers and each background search result. The answers may be used by background module 115 to populate the fields of a template associated with background information.

In step 1505, background module 115 may query the idea database 120 for more "how" answers that have not yet been searched. If there are any how answers left, background module 115 may return to step 1502. If all "how" answers have been processed, the background module 115 may compile the information in the background template in step 1506.

In step 1507, background module 115 may store the resulting compilation into disclosure database 1508, and in step 1508, the method may return to the ideation module 112.

FIG. 16 illustrates an exemplary database 1600 for storing documented creation and innovation activities. The illustrated disclosure database 1600 is where the formatted and filled-in templates may be stored for each session or idea. As illustrated, each session or idea may be associated with a specific record number, background file, claims file, value vile, prior art file, independent claims header file, claim elements file, wherein file, and dependent claims file.

Each field in database 1600 may identify text files of the converted spoken response to the queries of the various modules 113-115. For example, the response to the query regarding what problem is being solved as posed by the "how and why" module are stored under the "Background" as prepared by the background module. Likewise, claims may be constructed based on the files stored for header, claim elements, wherein, and dependent claims.

Figure 17:
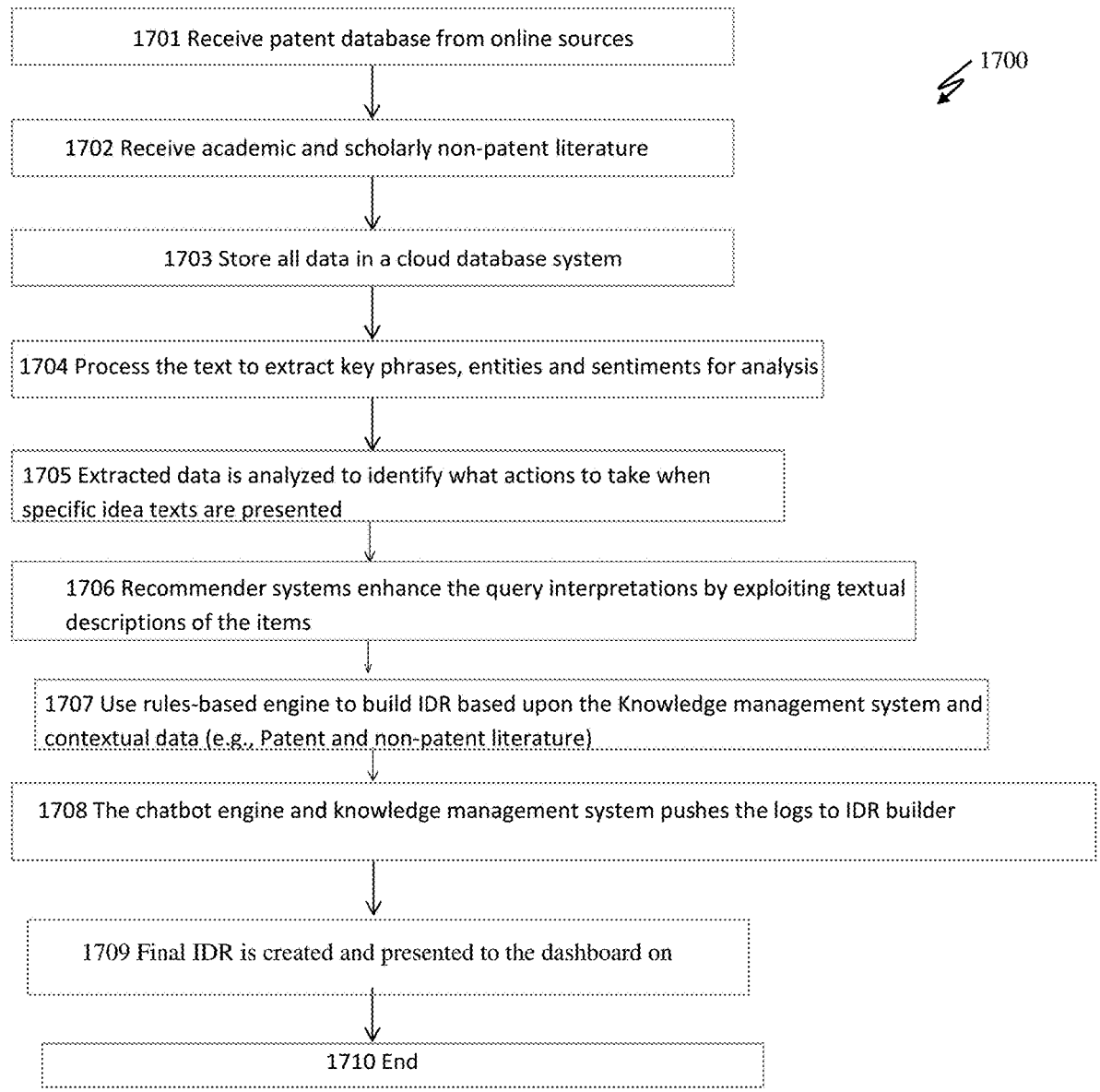
FIG. 17 is a flowchart illustrating an exemplary method for intelligence-driven documentation in accordance with a patenting template.

FIG. 17 is a flowchart illustrating an exemplary method 1700 for intelligence-driven documentation in accordance with a patenting template. Such method 1700 may be performed based on execution of the IDR builder 208.

In step 1701, IDR builder 208 may receive patent database search results from various online sources (e.g., USPTO online database, API into Lens.org, Patseer, Thomson, Questel) In step 1702, IDR builder 208 may receive academic and scholarly literature (e.g., from such sources as Google Scholar, academic journals, etc.)

In step 1703, IDR builder 208 may store data in a cloud database system, and in step 1704, IDR builder 208 may process the text to extract key phrases, entities and sentiments from the retrieved online sources and stored in the cloud database.

In step 1705, IDR builder 208 may extract and analyze data to identify what actions to take based on specific idea texts, and in step 1706, IDR builder 208 may use recommender systems to enhance the query interpretations by exploiting textual descriptions of the ideas. This may bring up the most relevant background content and concepts to the IDR builder 208.

In step 1707, IDR builder 208 may use rules-based engine to build an IDR based upon such background content in conjunction with the knowledge management system 207.

In step 1708, the chatbot engine 206 and knowledge management system 207 may push the logs to IDR builder 208, which creates a final IDR for presentation to the dashboard 211 in step 1709. In step 1710, the method ends.

Embodiments of the present disclosure may be provided as a computer program product, which may include a computer-readable medium tangibly embodying thereon instructions, which may be used to program a computer (or other electronic devices) to perform a process. The computer-readable medium may include, but is not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions (e.g., computer programming code, such as software or firmware). Moreover, embodiments of the present disclosure may also be downloaded as one or more computer program products, wherein the program may be transferred from a remote computer to a requesting computer by way of data signals embodied in a carrier wave or other propagation medium via a communication link (e.g., a modem or network connection).

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A system for ideation management, the system comprising:
    memory that stores a plurality of documentation templates, each documentation template associated with a different set of data fields;
    a microphone that captures audio data during a session; and
    a processor that executes instructions stored in memory, wherein execution of the instructions by the processor:
        identifies when the audio data includes a trigger term indicative of intent to record subsequent audio data during the session, wherein the subsequent audio data is recorded in response to the trigger term, parses the recorded audio data to identify one or more keywords or phrases spoken subsequent to the trigger term, wherein an idea documentation workflow is defined based on the identified keywords or phrases, selects one or more documentation templates from the memory based on the idea documentation workflow, poses a series of queries to one or more participants in the session in accordance with the selected documentation templates, wherein each successive query is based on a response to a preceding query, and wherein the series of queries include a how query or a why query in relation to one or more of the identified keywords or phrases, identifies which of the data fields of the selected documentation templates correspond to each of the responses to the series of queries, and prepares a disclosure report based on the selected documentation templates and the responses to the series of queries, wherein preparing the disclosure report comprises populating the identified data fields of the selected documentation templates with a transcription of each of the corresponding responses to the series of queries.

2. The system of claim 1, wherein the memory further stores a database of creativity tools, and wherein the processor executes a selected one of the creativity tools during the session, the audio data including interaction by the participant s with the selected creativity tool.

3. The system of claim 2, wherein the processor selects the selected creativity tool based on a current state of the session in accordance with rules refined by deep learning.

4. The system of claim 1, wherein the memory further stores a record of the idea documentation workflow, the record including one or more files.

5. The system of claim 4, wherein at least one of the files includes a recording of the audio data.

6. The system of claim 4, wherein at least one of the files includes a transcription of the audio data.

7. The system of claim 1, wherein the processor poses the series of queries via at least one of a virtual assistant and a chatbot.

8. The system of claim 1, further comprising a network interface that:

communicates a search request over a communication network with one or more data sources, the search request regarding background data for the idea documentation workflow defined based on the keywords; and receives one or more search results from the data sources, wherein the processor:

filters the received search results based on a level of similarity to the idea documentation workflow to identify a set of search results that meet at least a predetermined level of similarity; and populates a template associated with background data, wherein the populated background template is compiled into the disclosure report.

9. The system of claim 8, wherein the processor further flags one or more portions of each search result that meet the predetermined level of similarity, and presents the flagged portions to the participants.

10. The system of claim 1, wherein at least one of the templates corresponds to a technical invention, and wherein the set of fields in the at least one template corresponds to technical invention elements.

11. A method for ideation management, the method comprising:

storing a plurality of documentation templates in memory, each documentation template associated with a different set of data fields;

capturing audio data via a microphone during a session; and executing instructions stored in memory, wherein execution of the instructions by a processor:

identifies when the audio data includes a trigger term indicative of intent to record subsequent audio data during the session, wherein the subsequent audio data is recorded in response to the trigger term, parses the recorded audio data to identify one or more keywords or phrases spoken subsequent to the trigger term, wherein an idea documentation workflow is defined based on the identified keywords or phrases, selects one or more documentation templates from a database based on the idea documentation workflow, poses a series of queries to one or more participants in the session in accordance with the selected documentation templates, wherein each successive query is based on a response to a preceding query, and wherein the series of queries include a how query or a why query in relation to one or more of the identified keywords or phrases, identifies which of the data fields of the selected documentation templates correspond to each of the responses to the series of queries, and prepares a disclosure report based on the selected documentation templates and the responses to the series of queries, wherein preparing the disclosure report comprises populating the identified data fields of the selected documentation templates with a transcription of each of the corresponding responses to the series of queries.

12. The method of claim 11, further comprising storing a database of creativity tools in the memory, and executing a selected one of the creativity tools during the session, the audio data including interaction by the participant s with the selected creativity tool.

13. The method of claim 12, further comprising selecting the selected creativity tool based on a current state of the session in accordance with rules refined by deep learning.

14. The method of claim 11, further comprising storing a record of the idea documentation workflow in memory, the record including one or more files.

15. The method of claim 14, wherein at least one of the files includes a recording of the audio data.

16. The method of claim 14, wherein at least one of the files includes a transcription of the audio data.

17. The method of claim 11, wherein the series of queries are posed via at least one of a virtual assistant and a chatbot.

18. The method of claim 11, further comprising:

communicating a search request over a communication network with one or more data sources, the search request regarding background data for the idea documentation workflow defined based on the keywords;

receiving one or more search results from the data sources;

filtering the received search results based on a level of similarity to the idea documentation workflow to identify a set of search results that meet at least a predetermined level of similarity; and populating a template associated with background data, wherein the populated background template is compiled into the disclosure report.

19. The method of claim 18, further comprising flagging one or more portions of each search result that meet the predetermined level of similarity, and presenting the flagged portions to the participants.

20. The method of claim 11, wherein at least one of the templates corresponds to a technical invention, and wherein the set of fields in the at least one template corresponds to technical invention elements.

21. A non-transitory, computer-readable storage medium, having embodied thereon a program executable by a processor to perform a method for ideation management, the method comprising:

storing a plurality of documentation templates in memory, each documentation template associated with a different set of data fields;

capturing audio data via a microphone during a session;

identifying when the audio data includes a trigger term indicative of intent to record subsequent audio data during the session, wherein the subsequent audio data is recorded in response to the trigger term, parsing the recorded audio data to identify one or more keywords or phrases spoken subsequent to the trigger term, wherein an idea documentation workflow is defined based on the identified keywords or phrases, selecting one or more documentation templates from a database based on the idea documentation workflow, posing a series of queries to one or more participants in the session in accordance with the selected documentation templates, wherein each successive query is based on a response to a preceding query, and wherein the series of queries include a how query or a why query in relation to one or more of the identified keywords or phrases, identifying which of the data fields of the selected documentation templates correspond to each of the responses to the series of queries, and preparing a disclosure report based on the selected documentation templates and the responses to the series of queries, wherein preparing the disclosure report comprises populating the identified data fields of the selected documentation templates with a transcription of each of the corresponding responses to the series of queries.

\* \* \* \* \*